US010690718B2

(12) United States Patent
Johnson et al.

(10) Patent No.: US 10,690,718 B2
(45) Date of Patent: Jun. 23, 2020

(54) USING EMBEDDED TIME-VARYING CODE GENERATOR TO PROVIDE SECURE ACCESS TO EMBEDDED CONTENT IN AN ON CHIP ACCESS ARCHITECTURE

(71) Applicant: SiliconAid Solutions, Inc., Buda, TX (US)

(72) Inventors: James M. Johnson, Buda, TX (US); Alfred L. Crouch, Cedar Park, TX (US)

(73) Assignee: SiliconAid Solutions, Inc., Buda, TX (US)

( * ) Notice: Subject to any disclaimer, the term of this patent is extended or adjusted under 35 U.S.C. 154(b) by 438 days.

(21) Appl. No.: 15/347,753

(22) Filed: Nov. 9, 2016

(65) Prior Publication Data

US 2017/0131355 A1    May 11, 2017

Related U.S. Application Data

(60) Provisional application No. 62/252,763, filed on Nov. 9, 2015.

(51) Int. Cl.
*G01R 31/00* (2006.01)
*G01R 31/317* (2006.01)
*G01R 31/3185* (2006.01)

(52) U.S. Cl.
CPC .......... *G01R 31/31719* (2013.01); *G01R 31/318588* (2013.01)

(58) Field of Classification Search
CPC .......... G06F 21/79; G06F 21/80; G06F 21/72; G06F 21/75
See application file for complete search history.

(56) References Cited

U.S. PATENT DOCUMENTS

| 5,570,307 | A | * | 10/1996 | Takahashi | ................. G06F 1/02 331/78 |
| 5,963,104 | A | * | 10/1999 | Buer | ...................... G06F 7/588 331/78 |
| 8,881,301 | B2 | | 11/2014 | Crouch | |

(Continued)

OTHER PUBLICATIONS

Baranowski, et al., "Access Port Protection for Reconfigurable Scan Networks" J Electron Test (2014) 30:711-723. Springer Science Business Media New York, pp. 1-13 (Year: 2014).*

(Continued)

*Primary Examiner* — Harunur Rashid
(74) *Attorney, Agent, or Firm* — Hunt Pennington Kumar & Dula PLLC

(57) ABSTRACT

A network of storage units has a data path, which is at least a portion of the network. The network also has a dynamic time-varying or cycle-varying code generation unit and a code comparator unit that together make up an unlock signal generation unit; and a gateway storage unit. If the gateway storage unit does not store an unlock signal or the unlock signal generation unit does not generate and transmit an unlock signal, the gateway storage unit does not insert a data path segment in the data path. If the unlock signal generation unit is operated such that it generates an unlock signal, and it transmits that unlock signal to a gateway storage unit, and the gateway storage unit stores the unlock signal value, then the gateway storage unit inserts a data path segment into the data path.

5 Claims, 17 Drawing Sheets

(56) References Cited

U.S. PATENT DOCUMENTS

| | | | |
|---|---|---|---|
| 9,305,186 B2 | 4/2016 | Crouch | |
| 2011/0299678 A1* | 12/2011 | Deas | H04L 9/003 380/28 |
| 2015/0026534 A1* | 1/2015 | Whetsel | G01R 31/318533 714/727 |
| 2015/0349969 A1* | 12/2015 | Dworak | G01R 31/318588 380/28 |

OTHER PUBLICATIONS

Baranowski, et al., "Access Fort Protection for Reconfigureabie Scan Networks," J Electron Test (2014) 30:711-723. Springer Science Business Media New York, pp. 1-13 (Year: 2014).

\* cited by examiner

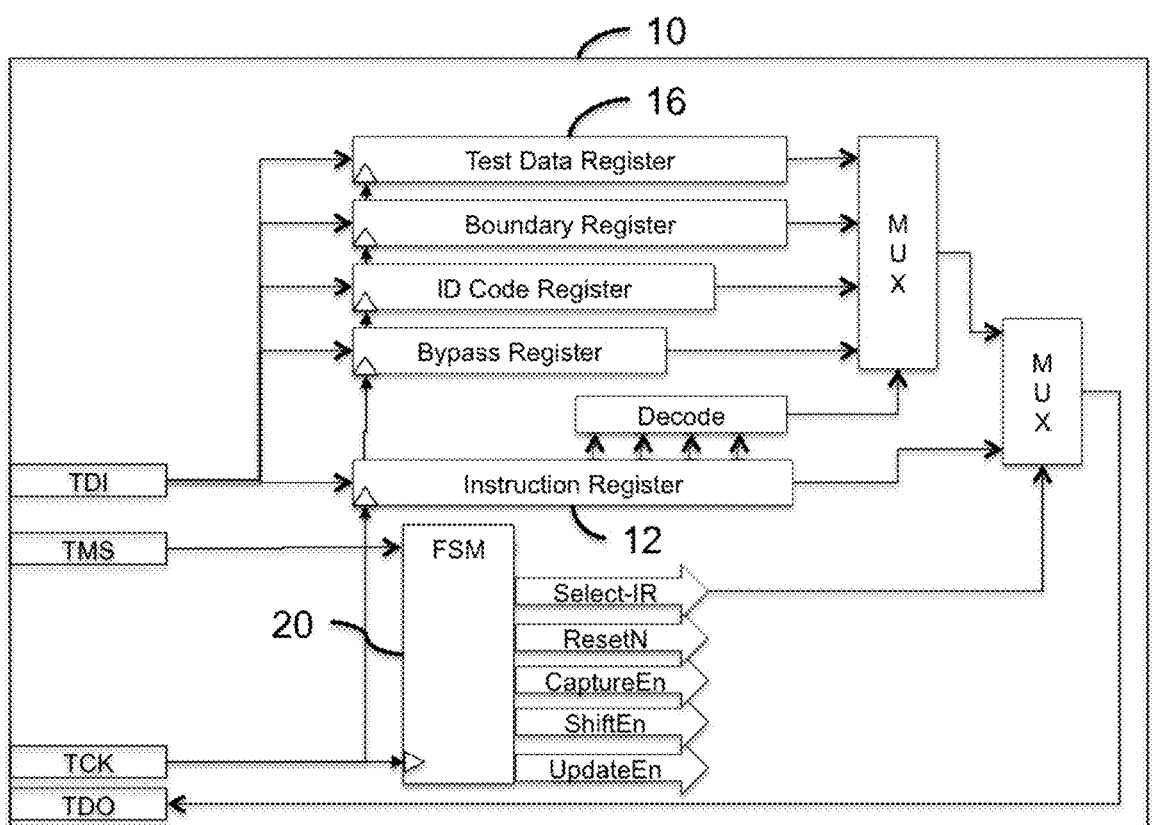
FIG. 1: PRIOR ART

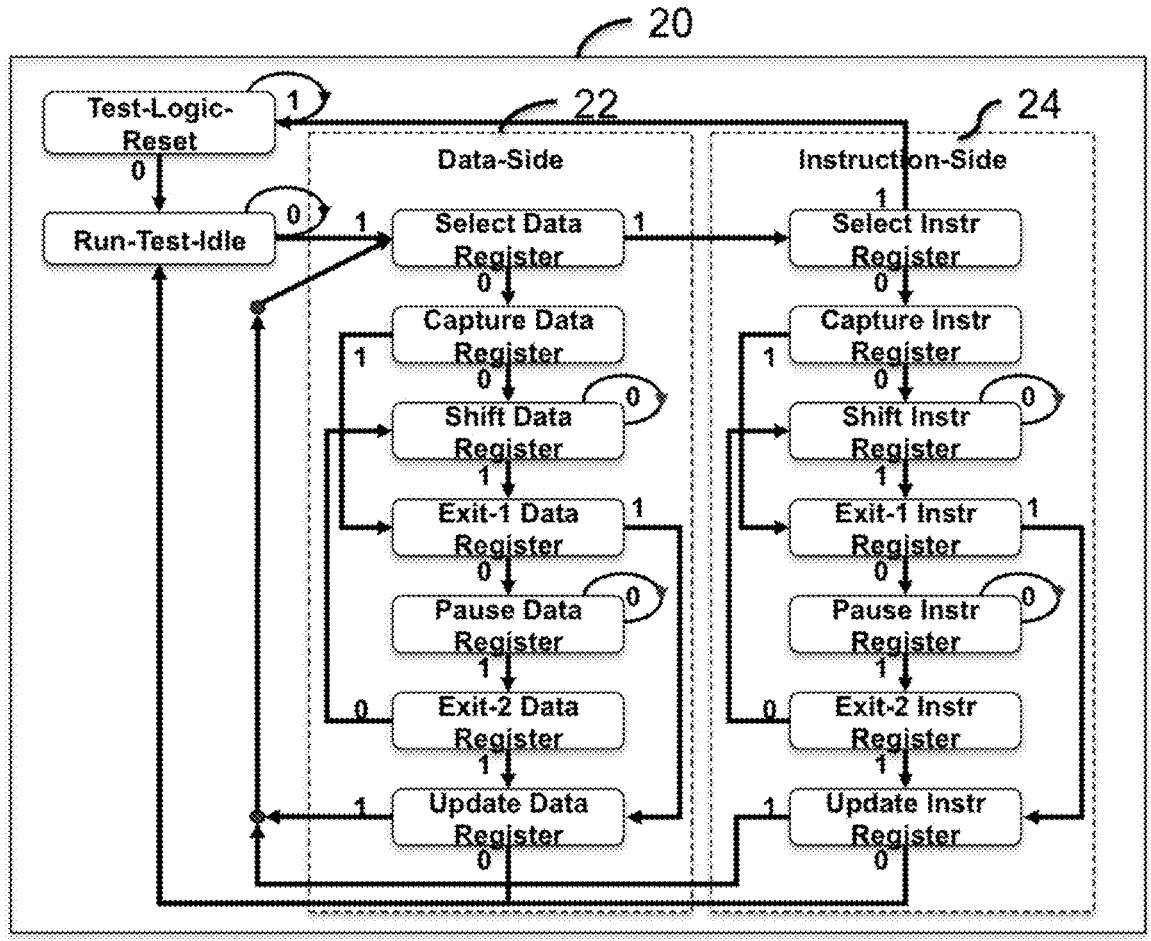
FIG. 2: PRIOR ART
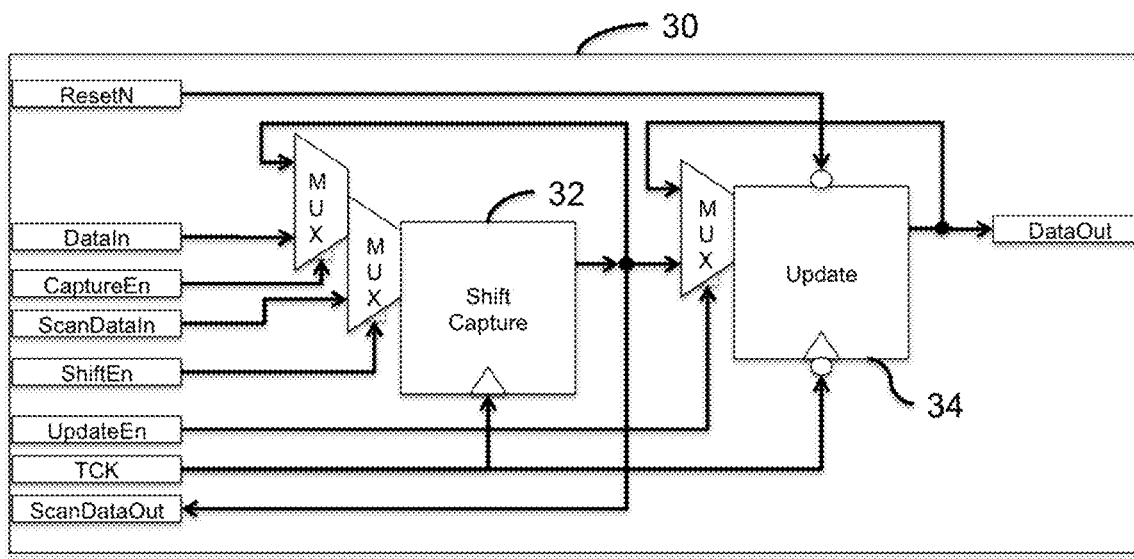
FIG. 3: PRIOR ART

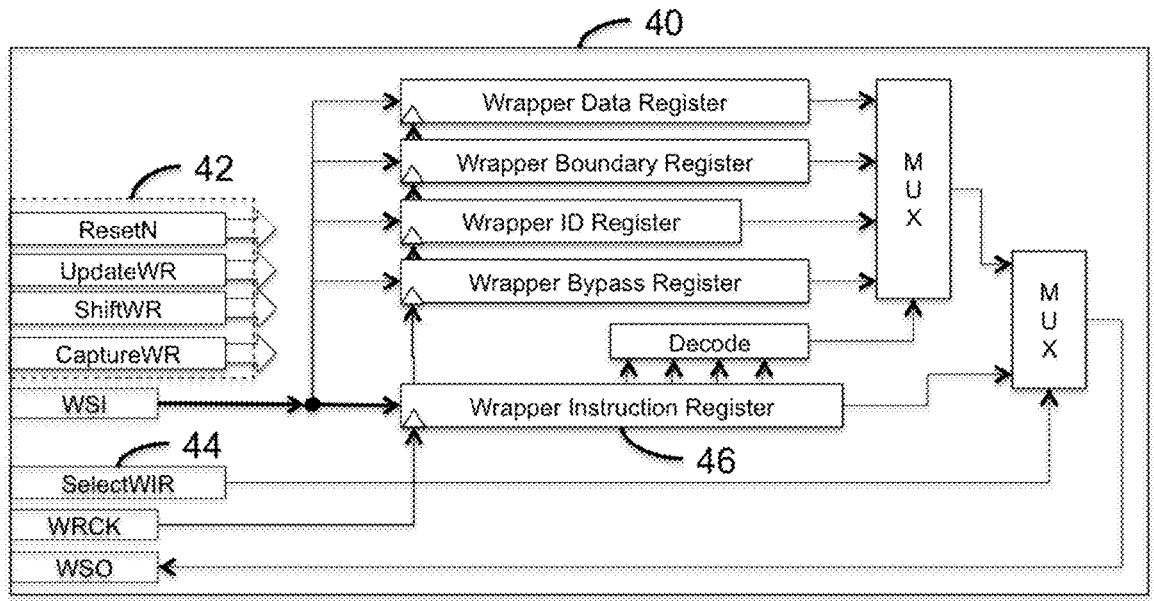
FIG. 4: PRIOR ART
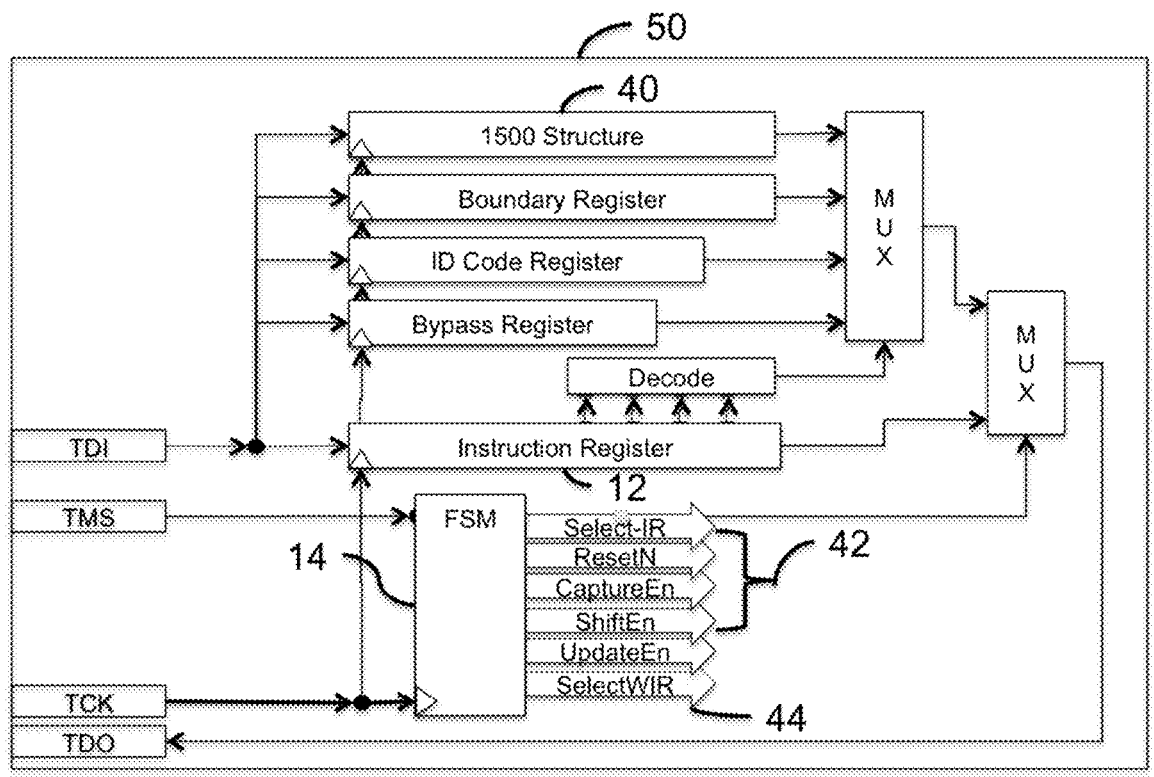
FIG. 5: PRIOR ART

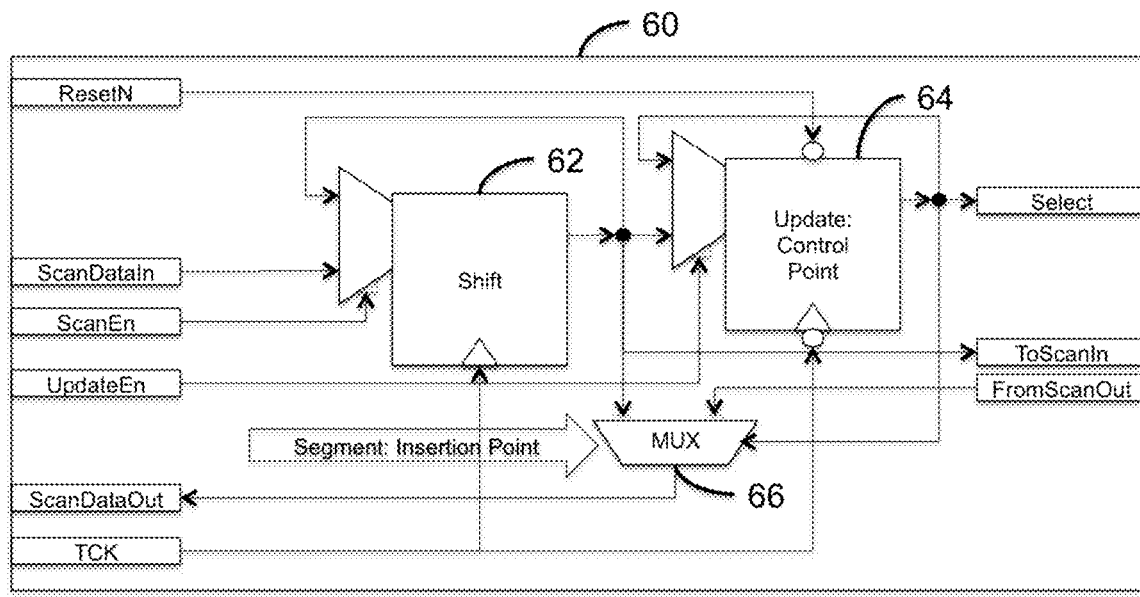
FIG. 6: PRIOR ART
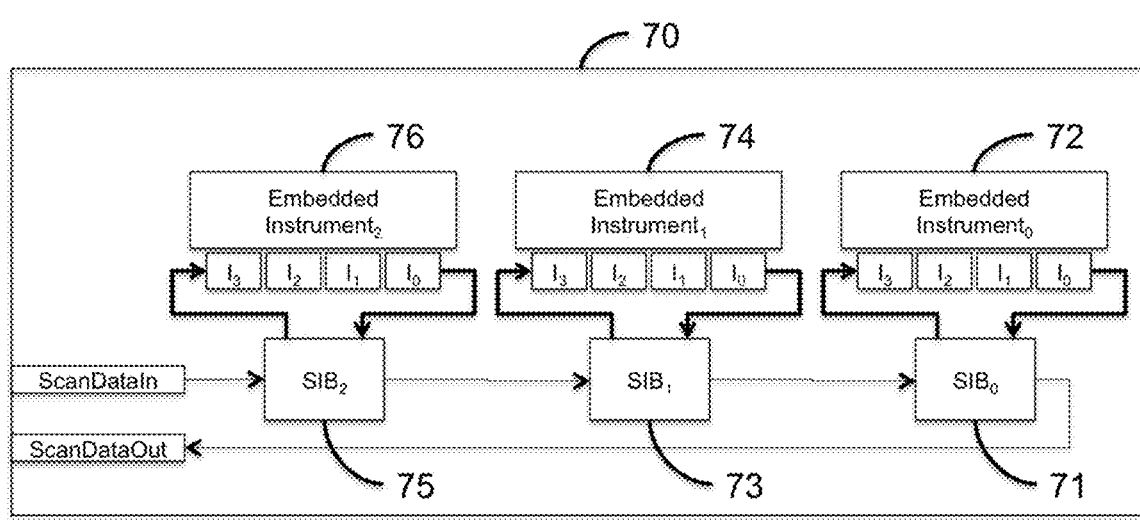
FIG. 7: PRIOR ART

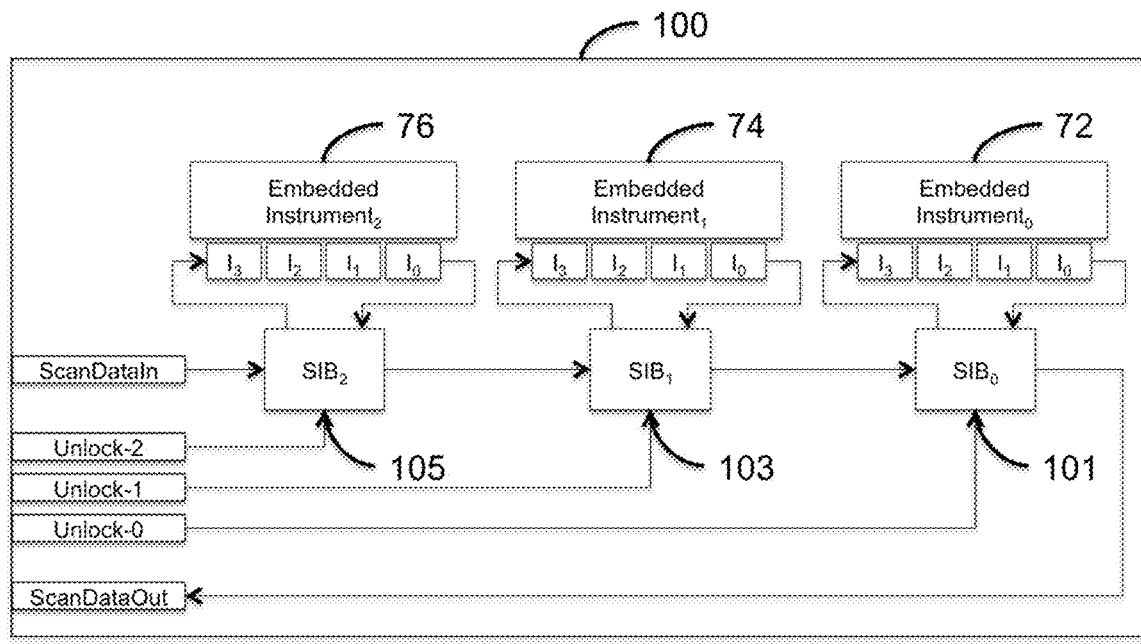
FIG. 10
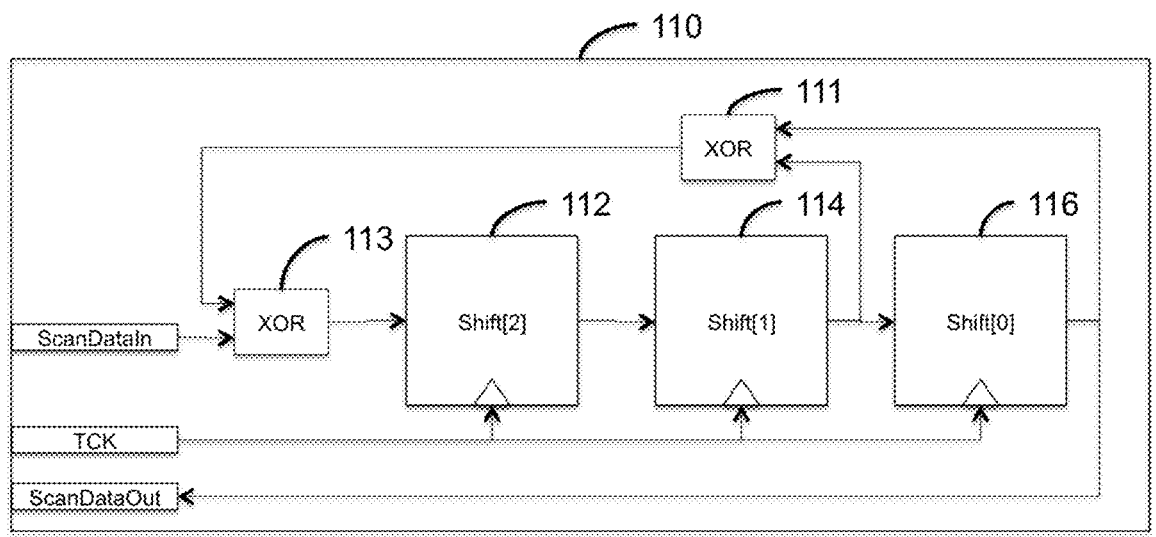
FIG. 11: PRIOR ART

USING EMBEDDED TIME-VARYING CODE GENERATOR TO PROVIDE SECURE ACCESS TO EMBEDDED CONTENT IN AN ON CHIP ACCESS ARCHITECTURE

CROSS REFERENCE TO RELATED APPLICATIONS

This application is related to the following:
1. Provisional Application Ser. No. 62/252,763, filed 9 Nov. 2015 ("Parent Provisional").

This application claims priority to the Parent Provisional, and hereby claims benefit of the filing date thereof pursuant to 37 CFR § 1.78(a)(4).

The subject matter of the Parent Provisional in its entirety is expressly incorporated herein by reference.

BACKGROUND

1. Field of Invention

The present invention presented herein relates to integrated circuits. More specifically, the present invention relates to integrated circuits that have test and debug ports and logic that requires built-in hardware security features and methods of operation to limit or restrict access and operation of some or all of the embedded registers, memories, instruments, circuits, or data accessible through the test and debug ports.

2. Description of Related Art

In general, in the descriptions that follow, the first occurrence of each special term of art that should be familiar to those skilled in the art of integrated circuits ("ICs") and systems will be italicized. In addition, when a term that may be new or that may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, the mutually exclusive boolean states may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Modern ICs are designed and manufactured today with many security concerns. In addition to hiding or protecting sensitive material that may be designed or stored within the IC—such as DVD codes, bank codes, and encryption codes—there is a concern that the IC itself, or some portion or function within the IC, may be reverse engineered, copied, or cloned. Once an IC is placed on a board or in an application, and then board or system level programming or operation begins, then the IC is part of a larger concern as sensitive operation data may pass through, be stored, or be processed by the IC—at this point, then actual physical tampering and electrical, mechanical, environmental, and emissions snooping may come into play; or the IC may be used as part of a denial of service ("DoS") or destructive test by operating it in an unauthorized manner. There may be many different ways that an attacker can address the chip so as to find out information about the IC's structure, it's role within a system, and the data it stores or processes. Protecting the IC from these various attacks as a standalone device or as a device on a board or contained within a system, is known as its security requirement. Many modern integrated circuit devices have functional or operational security requirements that have been solved mostly with encryption solutions such as RSA and AES—any data processed and either stored or passed through the physical pins of the IC's package is encrypted such that it makes no sense to the investigator unless they have the encryption code, sequence, or algorithm.

However, there is an aspect of the security requirement of the IC device that is often overlooked—the test and debug ports. Test and debug ports—such as the 1149.1 Joint Test Action Group ("JTAG") four pin (optional 5 pin) Test Access Port ("TAP") connection to the JTAG Controller and its defined internal scan register architecture—often provides unobstructed access to registers, data, test (scan and Built In Self-Test ("BIST")), and debug (assertion, breakpoint, trigger and tracing functions) within the chip. Other ports than just the JTAG are also considered test and debug ports, for example, the Serial Peripheral Interface ("SPI"), or the Inter-Integrated Circuit ("I2C"), or the Serial-Wire Debug ("SWD") ports are all common in the industry. The fundamental tenets of test and debug—controllability, observability, accessibility, and traceability—are often at odds with the security requirement, and so test and debug are viewed as an unmanaged back door by those with security concerns. Test and debug often not only provides access to data, registers and functions within the IC that should remain hidden, but also provides access to functions that could be used to prevent the IC from operating normally, e.g., a DoS attack, or that could be used to damage or destroy the chip, e.g., a destructive-operation attack. The test and debug ports also present another problem—there is ready availability to inexpensive test and debug hardware and software to operate these standardized and pseudo-standardized ports. This makes the perceived backdoor an even greater security risk.

There are some common industry applied methods used to prevent the test and debug ports from being used for illicit or nefarious purposes—the most common one being the disabling of the test and/or debug port(s) completely by fusing off its connection to the package pins, e.g., creating an open circuit between the package pin and the on-silicon signal, while, for example, pulling the signal down to a logic_0 internally. The disabling operation, however, generally occurs after IC test has successfully completed and so all downstream use of the port after the IC is verified as being good and salable is no longer viable. This denies the board or system user of the IC from being able to access and operate the test and debug functions that were originally standardized to allow IC integration operations such as IC solder-down and interconnect testing and in-system software development.

It would be advantageous to allow the legal authorized user of the IC to take advantage of these functions that are normally accessible after the IC has been through its manufacturing test and product distribution stages, so what is needed is some form of security-managed access where the test and debug port and controller remain active, but have some form of authorization usage model. In addition, security-managed access has further restrictions placed upon it by the design and test organizations—it cannot come at a high premium of either impact to the IC's design budgets (silicon area, gates, power, routing, route congestion, pins, timing, timing closure); or impact to the IC's test and debug quality and costs (test development effort, test coverage, test time, debug data correctness, debug data tags, debug time, and ATE cost). These budget and cost restrictions make the sophisticated encryption solutions that are most commonly applied to the functional pathways, too expensive in silicon area, too slow in test time, and too complex for use on common automatic test equipment ("ATE"). Note that security-managed access associated with the test and debug ports also needs to have some form of metric to quantify the security protection in the same manner as the functional security can be rated. The most common measurement currently applied is "how long should it take to break the security with a common hardware setup or with a common attack setup or scenario?"

BRIEF SUMMARY OF INVENTION

Modern IC's have many embedded items that must remain hidden—registers, features, codes and data. These items may be accessible not only from functional operation, but also through the test and debug ports, which are often forgotten or ignored by the security designer of the IC. These items must be protected not only from data and operation investigation, but from physical investigation using voltage, current and logic probes; logic analyzers; and sideband investigations with alternate equipment such as thermal cameras, sonic sensors, light detectors, and other monitors and sensors. In fact, the IC needs to be able to be protected from investigation even from legal and authorized test and debug tools. This means that operating and capturing a legal sequence or action and replaying it later with a different setup must also be prevented. To support security that would prevent these nefarious investigative actions, embedded items of importance should be hidden and should only be accessible if authorized. To facilitate this, the access should only be allowed if the external tester or software can communicate with the IC through an algorithmic and time-varying or cycle-varying manner—where input and output data does not provide a one-to-one match to actions or operations within the chip and is not easily repeatable. In addition, to extend the security for the product lifetime of the IC, it may be advisable to make some portion of the security implementation to be easily changeable or programmable.

One embodiment of the current invention provides such a method by using standard test and debug structures associated with the IEEE standards 1149.1, 1500, and 1687—and incorporating at least one time-varying or cycle-varying code-generator, code comparator, and scan-segment locking mechanism and distributing these items across the test and debug architecture to minimize local hot spots and to obfuscate the relationship between the related hardware elements. The time-varying code-generator produces an inherent encryption in that the data passing through the input and output pins does not have a direct 1-to-1 relationship with any data-consuming device.

BRIEF DESCRIPTION OF THE SEVERAL VIEWS OF THE DRAWINGS

FIG. 1 illustrates, in block diagram form, a prior art diagram of the IEEE 1149.1 JTAG Test Access Port (TAP) register architecture;

FIG. 2 illustrates, in diagrammatic form, a prior art diagram of the IEEE 1149.1 JTAG operation protocol Finite State Machine ("FSM");

FIG. 3 depicts an example of a typical individual JTAG Shift-Capture-Update cell;

FIG. 4 is a diagram of the IEEE 1500 Embedded Core Test Wrapper register architecture;

FIG. 5 is a diagram of the IEEE 1500 architecture subsumed within the 1149.1 TAP register architecture;

FIG. 6 depicts an example of an IEEE 1687 Post-Segment-Insertion-Bit (Post-SIB);

FIG. 7 depicts an example IEEE 1687 serial network illustrating how a SIB may provide access to a hidden scan path segment that provides access to a hidden instrument;

FIG. 10 depicts an example IEEE 1687 serial network with security unlock signals illustrating how a SIB may provide secured access to a hidden scan path segment that provides access to a hidden instrument;

FIG. 11 depicts an example prior art primitive polynomial Linear Feedback Shift Register (LFSR) that can be used to generate a time-varying pseudo-random state sequence;

DETAILED DESCRIPTION

Figure 8:
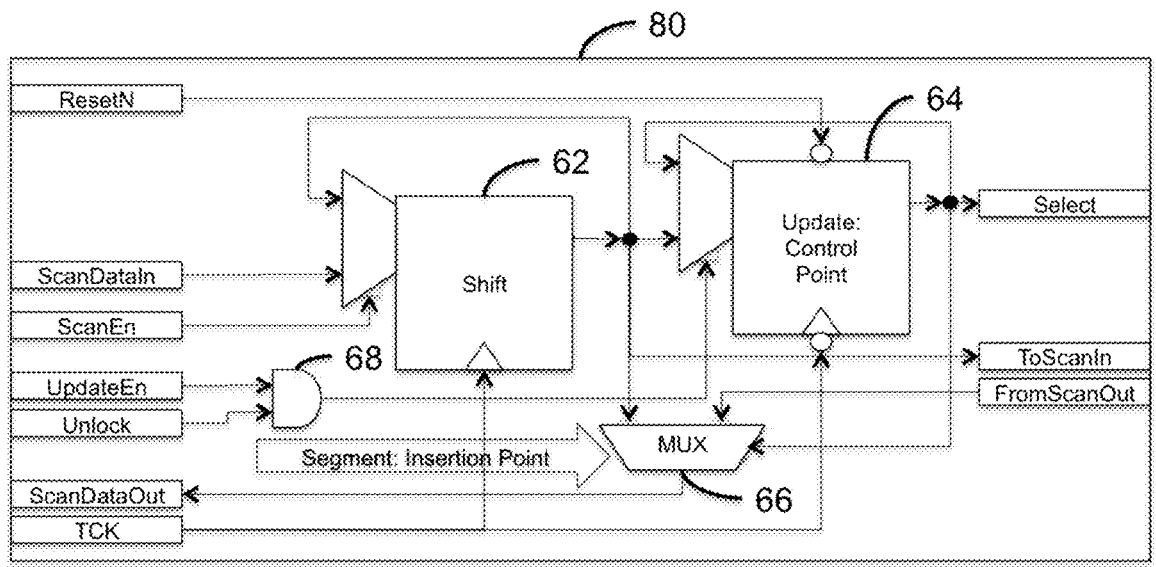
FIG. 8 depicts a SIB with an update-operation-blocking feature to restrict access to a hidden scan path segment.

There are many possible test and debug ports that can be used to investigate the inner structure and workings of a complex integrated circuit. For purposes of ease of understanding and clarity of explanation, the IEEE Standard's-based 1149.1 JTAG TAP, controller and register architecture 10, illustrated in FIG. 1, will be used as the explained embodiment—however, the techniques described may be applied equally to other existing test and debug ports and controllers (such as serial ports I2C, SPI, or USB; or parallel ports such as the AMBA bus).

The IEEE 1149.1 JTAG TAP has a known and mandated structure since it must be designed to comply with an IEEE standard. FIG. 1 shows a high-level diagram of a typical configuration of the JTAG TAP register architecture 10 with the serial input data port pin Test Data In ("TDI") being connected to several internal registers in parallel, but only one of those registers is active and in the serial scan path as a collection of data path storage elements, or data path storage units, organized into a shift register during an operation, and that register is chosen by the data value or encoding held within the instruction register 12. The selected active scan path is then also connected to the TDO (Test Data Out) data out port pin through a series of multiplexors. JTAG TAP register architecture 10 includes a FSM 20, illustrated in detail in FIG. 2, that controls the protocol of operation of this architecture. By way of example, when the device first comes out of reset, the FSM 20 is in the Test-Logic-Reset ("TLR") state and, as is known and depending upon the specific implementation, the reset action places either the Bypass or the IDCode instruction into the instruction register 12. As one of ordinary skill in this art would understand, the FSM 20 is operated by the Test Mode Select ("TMS") signal in conjunction with the Test Clock ("TCK") synchronizing signal. Referring to FIG. 2, the FSM 20 includes two main branches, one branch known as the Data-Side 22 that operates the active selected data register, and one branch known as the Instruction-Side 24 that operates the instruction register 12. To change the active register that is selected, the FSM 20 must be traversed on the instruction side 24 to change the encoding value in the instruction register 12. The FSM 20 also generates operation signals and they are decoded and delivered to the active registers—these operation signals represent the ability to capture data, to shift data, to update data, or to reset the register. When the FSM 20 is on the instruction-side 24, the data entering TDI through the shift process represents instruction encodings; when on the data-side, the data entering TDI through the shift process represents test, debug, or operation data associated with the chosen register.

The FSM 20 also generates several operation signals that are used to operate the various registers and their sequence of generation and application represents the operation protocol of JTAG and JTAG-like registers. Most typically, these signals remain asserted for one TCK cycle and include: (i) a Capture-Enable ("CaptureEn") signal which is asserted on the rising-edge of TCK when leaving the Capture Data Register state or Capture Instruction Register state; (ii) a Shift-Enable ("ShiftEn") signal which is asserted on the rising-edge of TCK when leaving the Shift Data Register state or Shift Instruction Register state; (iii) an Update-Enable ("UpdateEn") signal which is asserted on the falling-edge of TCK when in the Update-Data Register state or Update Instruction Register state; and (iv) a Reset signal that is asserted when the FSM 20 is in the TLR state. As is known, all of the 1149.1 style registers are configured to use these signals or some subset of these signals. It is noted that other signals may be generated by the TAP FSM 20 in some specific implementations, e.g., a Pause-Enable ("PauseEn") signal may be asserted on the rising-edge of TCK when leaving the Pause Data Register state or Pause Instruction Register state, and a Run-Enable ("RunEn" or "Run") signal may be asserted on the rising-edge of TCK leaving the Run-Test-Idle state which is a parking state that can continually loop as long as TMS remains a logic_0.

FIG. 3 shows a typical JTAG register bit cell 30 that uses the CaptureEn, ShiftEn, UpdateEn, and ResetN signals to conduct capture, shift, update, and reset operations. A set of multiplexors are generally used and coupled to a shift element 32. During operation, this set of signals are used to move serial shift data from ScanDataIn to ScanDataOut when ShiftEn is asserted, or to capture DataIn when CaptureEn is asserted. When neither the shift or capture operation signals are asserted, the shift element 32 holds its data state. JTAG register bit cell 30 also includes an update element 34 that allows a data state to be held stable while the shift element 32 is active. This type of bit cell 30 is generally used in TDR 16 (see, FIG. 1) as the data interface to an embedded instrument.

The length of a TDR 16 is considered to be the number of scan-shift bits 30 that the register contains. During operation, the scan shift process occurs on the rising-edge of the TCK clock signal and moves or transmits data from the ScanDataIn signal, into the shift flip-flop 32 and presents that data on the ScanDataOut signal. It should be noted that the ScanDataIn signal will ultimately be traced back to the input data port TDI, shown in FIG. 1, and the ScanDataOut signal will ultimately be traced forward to the output data port TDO, shown in FIG. 1. Optionally, the shift cell 32 may also be used to capture data. This data may come from various places within the IC design or from the update-side 34 of the cell. During operation, this capture occurs on the rising-edge of TCK when the CaptureEn signal is asserted. Additionally, there may be an update flip-flop 34 to hold data stable while the shift process occurs to provide a ripple free data output signal or to provide a persistent output signal while other operations occur. During operation, the update element 34 captures data only when the UpdateEn signal is asserted and on the falling-edge of TCK. If the update element 34 is supported, then there may also be a reset signal that may be synchronously generated by the FSM 20, known as TLR-Reset, or may be asynchronously brought in from a package pin, i.e., a TRSTN signal. The ShiftEn, CaptureEn, and UpdateEn signals are all mutual-exclusive in assertion periods due to the state-separated protocol generated by the FSM 20 state definitions, i.e., none of these signals are ever asserted simultaneously. The capture, shift and update operations can be considered at a higher level of operation if they are viewed as TDR 16 operations when the TDR is interfaced to, for example, an embedded test function like a memory BIST. In an embedded test function like memory BIST, there are two main operations. The first operation is the read operation which is the combination of capturing data into the TDR 16 and then shifting that data out of the chip to be viewed by an external software process. The second operation is the write operation which is the combination of shifting data into the TDR 16 from the outside of the IC and then conducting an update operation.

Currently, security of an IC is established by disabling this test and debug architecture. One way of disabling the test and debug architecture is by placing a fuse and a pullup device on the incoming TMS signal line prior to the FSM 20. Other methods are anticipated. The fuse may be cut or blown, thus leaving an open circuit between the TMS package pin on the IC and the TMS connection to the FSM. The pullup device forces the FSM 20 connection to a logic_1. After a number of TCK cycle, e.g., 5 TCK cycles, the FSM 20 is guaranteed to enter the TLR state. In the TLR state, a reset signal (TLR-Reset) is asserted and will remain in the TLR state, or parking state, so long as TMS remains asserted at a logic_1. These internal registers are thereby inaccessible. Many of these registers were integrated into the IC to help with the integration of the IC onto a board. By way of example, and without limitation, the Boundary Scan Register (see, FIG. 1 Boundary Register) has several associated instructions, well understood by one of ordinary skill, when selected and configured properly, allow the board-to-IC connection to be verified with an interconnect test.

In any given design there may be multiple different individual TDRs 16 supported, and each different TDR 16 can be selected by different encodings in the instruction register 12. Alternate security methods involve limiting access to certain registers by requiring one instruction encoding to be installed into the instruction register 12, and a known data value placed in the unique TDR 16 selected by the instruction register 12, before a different target TDR 16 can be selected by a different instruction encoding in the instruction register 12. This is the use of a "static key value" in one TDR to "restrict access to another TDR". There are, however, issues inherent to this type of security. By way of example, the security mechanism is visible by way of the required documentation. Another example is that by monitoring the TDI and TDO serial data signals, the codes and sequences of operation may be physically captured and replayed at a later time. The instruction register 12 is documented in the Boundary Scan Description Language ("BDSL") file delivered with the IC, i.e., the length of the instruction register 12 and the mandated and optional public instruction encodings are documented. Other instructions may be deemed "private" and do not need to be documented. However, that an instruction register has a documented length, i.e., 5-bits long, provides the observer knowledge that there are a potential 32 possible instructions. If only 16 instructions are documented in the BSDL, then the observer knows that there are 16 undocumented instructions. These undocumented instructions may be easily be investigated by placing the "undocumented instruction encodings" into the instruction register 12 by shifting in serial data and then passing through the Update Instruction Register state of the FSM 20. The undocumented instructions are those encodings not displayed in the public instruction encodings.

Another method of security has been to place some form of decryption-encryption on the TDI or TDO pins at a point between the IC package pins and the connection to the register architecture 10. This decryption-encryption method obfuscates the data entering or leaving the chip through the TDI-TDO pins for all instructions. One issue with this method is that for a subset of instructions, the data encryption is visible. By way of example, and without limitation, the boundary scan register reflects the value of the register directly to the package pins because the boundary scan register is a register that places a test register at every input and output pin on the IC that is not a clock or power pin. Thus, one wishing to investigate the data being delivered into the chip for an instruction that selects an internal register need only to: (i) place a probe placed on the TDI pin, TDO pin, or both; (ii) place an instruction that selects the boundary scan register, i.e., EXTEST instruction, into the instruction register 12; and (iii) apply the data meant for some other register through the scan shifting process. The observer may then watch the data entering the chip through TDI, and may see the data after it passes through decryption directly on the pins of the IC.

One method to manage these problems is to base the security on the IEE 1500 Standard for Embedded Core Test ("SECT" or "1500 Standard"). The 1500 Standard is very similar to the 1149.1 standard, but designed to be applied to embedded cores, not whole IC's. To this end, the 1500 standard mandates a similar register architecture 40 as exists for the 1149.1 architecture 10, but does not support the FSM 20. The 1500 standard instead mandates the selection of data registers versus the instruction register 46 with the SelectWIR signal (which may be generated by the 1149.1 FSM 20 or may be sourced directly from an instruction encoding in the 1149.1 instruction register 12—the 1500 Standard does not mandate the manner of selection). FIG. 4 illustrates a test architecture according to the 1500 Standard. FIG. 4 illustrate a similar set of registers in the 1500 Standard to that of the 1149.1 Standard. However, the register set utilize the term wrapper. By way of example, and without limitation, the Boundary Scan Register ("BSR") in the 1149.1 Standard is represented in the 1500 Standard by the Wrapper Boundary Register ("WBR"). Because the FSM 20 is absent from the 1500 Standard wrapper architecture, the TMS signal is not represented, but instead is replaced with signals that would be generated by the FSM 20 under the 1149.1 Standard.

The 1500 Standard signal interface is intended to connect to, and to be driven by, a chip-level 1149.1 TAP and TAP controller 10, i.e., in lieu of the normal TMS signal specified by the 1149.1 Standard to operate the FSM 20, the 1500 Standard uses the the TDI (WSI), TDO (WSO), and TCK (WRCK) signals and to receive the SelectWIR, ShiftWR, CaptureWR, UpdateWR, and ResetN signals directly from the 1149.1 FSM 20. In effect, one or more 1149.1 instructions are used to select the entire 1500 Standard architecture as if it were a TDR 16 contained within the 1149.1 Standard register architecture. FIG. 5 illustrates an example of one such architecture 50, where the 1500 Standard block 40 is included in the 1149.1 Standard register architecture.

Once selected, the 1500 architecture 40 then supports its own instruction register 46 and set of instructions. To this end, there is then a level of hierarchy or level of indirection applied to the registers contained in the 1500 structure 40 buried within 1149.1's register architecture 10. It must be noted that the instructions of the 1500 instruction register 46 are not documented in the IC's BSDL and any encryption-decryption applied to the WSI and WSO signals will not normally be visible to the pins of the IC package except in some unique circumstances, i.e., if the boundary register of the 1500 wrapper 40 is also used as a portion of the boundary register of the IC itself.

Another structure recently adopted for use by the IEEE test standards, specifically the IEEE 1149.1-2013 and IEEE 1687-2014, is the Segment-Insertion-Bit ("SIB") 60. The SIB is a Shift-Update 62-64 type of cell that allows a scan path, i.e., a shift register, segment to be included or excluded from the active scan path during data-side 22 operations of the FSM 20 instead of requiring an instruction-side 24 operation of the FSM 20.

The SIB 60 has one configuration known as a Post-SIB. The Post-SIB configuration is delineated as such because the scan segment insertion point 66 is after the Select signal generation point 64, as illustrated in FIG. 6. The SIB 60 operates similarly to a typical 1149.1 Standard Shift-Update cell 30, i.e., operating in a Shift-Capture-Update without the capture capability. However, in this case, the update register 34 generates a Select signal instead of a data signal. The Select signal has two basic purposes. The first purpose is to switch the active scan path from the direct output of the shift cell (shift register portion) to the 'FromScanOut' of the included segment (which also receives the 'ToScanIn'). The second purpose of the Select signal is that it is used as an enable signal for the CaptureEn (capture-enable), ShiftEn (shift-enable), and UpdateEn (update-enable) of the newly included segment. Thus, the unselected scan path segment, i.e., Select is de-asserted, is unchanging because the scan path segment's ShiftEn, CaptureEn, and UpdateEn operation signals are not active when not enabled, even though the clock (TCK) may be actively toggling. The segment, whether selected or not, will still react to a reset operation.

FIG. 6 shows a Post-SIB 60. As is known, a Pre-SIB, i.e., where the scan path segment insertion point 66 is placed before the Select signal generation point 64, is also a valid configuration. During operation, the Post-SIB complies with the 1149.1 Standard FSM 20. In accordance with the 1149.1 Standard: (i) the shift operation occurs on the rising-edge of TCK when the ShiftEn is asserted; (ii) the shift data passes from ScanDataIn into the shift flip-flop 62 where it is presented to ScanDataOut directly through the ScanMux 66 when the Select signal generated by the Update element 64 is de-asserted; and (iii) the update operation occurs on the falling-edge of TCK when the UpdateEn is asserted. If the update operation places an assert value into the Update element 64 and the Select signal is asserted, then the scan data will travel from ScanDataIn to the ToScanIn. The ToScanIn signal is connected to the subsequent scan register to be added scan register segment and made an active part of the scan chain. That added scan register segment will produce the FromScanOut signal that will pass through the multiplexor (ScanMux) 66 and to the ScanDataOut signal. Upon a change in status of the SIB 60 to add a scan segment, the shift operation occurs after the FSM 20 passes through the Update Data Register state of the FSM 20 to either the Run-Test-Idle state or the Select Data Register state, and then continues through the Capture Data Register state and into the Shift Data Register state (see, FIG. 2). Conversely, if the segment is active, and passing through the Update Data Register state of the FSM 20 places a de-assert value in the update element 64, then on the following Shift Data Register state, the scan path will operate without the added register segment, i.e., it will have been removed from the scan path.

The SIB 60 is used to provide a more flexible method of managing active embedded instruments. In a traditional 1149.1 JTAG architecture 10, the instruction register 12 is used to select a scan register that is connected in the active scan path between TDI and TDO. The scan shift register can be a TDR 16 that interfaces directly to the embedded instrument. In general, one instruction encoding in the instruction register 12 selects one embedded instrument, which results in a 'one-at-a-time' type of selection and scheduling architecture, and provides minimal obfuscation for security purposes. Other options include placing all instruments into a single scan path, which leads to an 'all active' scheduling architecture. This generally results in a long scan path and the concomitant high-power consumption because all instrument interfaces are active, providing minimal obfuscation for security purposes. Many IC test and debug architectures can be made more efficient if multiple embedded instruments 72, 74, 76 can be scheduled simultaneously, but those not needed can be left in a quiescent state. This is known as schedulable concurrence of operation. The method used to achieve this scheduling flexibility is to have multiple SIBs 71, 73, 75 in a single active scan path and to then allow the data in the SIBs 71, 73, 75, when an update operation occurs, to select the active scan segments, leaving the remaining scan segments in a quiescent state. In this manner, a serial scan path can be viewed as a network of instruments where the SIB is viewed as a registered gateway element that allows the network to access the control and data path of the individual instruments.

FIG. 7 shows a typical scan network 70 with schedulable concurrence that includes three SIBs 71, 73, 75 in an active scan chain, and each of those SIBs provide access to TDR segments that interface to embedded instruments 72, 74, 76. When all SIBs hold de-assert values, i.e., after a reset operation, the scan path is 3 bits long. If an assert pattern is scanned in, e.g., such as <111>, and subsequently updated, the scan path will be the 3 SIBs, plus the added scan segment lengths.

By way of example, the scan network 70 illustrated in FIG. 7, shows 4-bit segments behind each SIB 71, 73, 75. The total length of the active scan path if all were active would be 15 bits. If only $SIB_2$ 75 were open, then the active scan path would be 7 bits. If two of the SIBs were open, i.e., $SIB_1$ 73 and $SIB_0$ 71, then the active scan path would be 11 bits long. One current art use of the SIB 60 for security purposes relies on not providing proper documentation of which bits within a scan network are in fact SIBs 60. However, this is easily defeated by a technique known as 'walking a 1' or 'walking a 0'. If SIBs 60 are designed as single control point elements, where only one update control point 64 is needed to switch the ScanMux 66, then shifting a logic_1 by one TCK and doing an update operation, then shifting the logic_1 by two TCKs and doing an update operation, and so on for the length of the scan path, will result in all SIBs being open that are activated by a logic_1 assertion. Similarly, 'walking a 0' will open all SIBs that are activated by a logic_0 assertion. To make this effort more difficult, multiple update control points 64 can be combined to generate the Select signal needed to switch a ScanMux 66. The collection of control points 64 are generally called keys and, similar to the 1149.1 TDR 16 values, are static keys.

Figure 9:
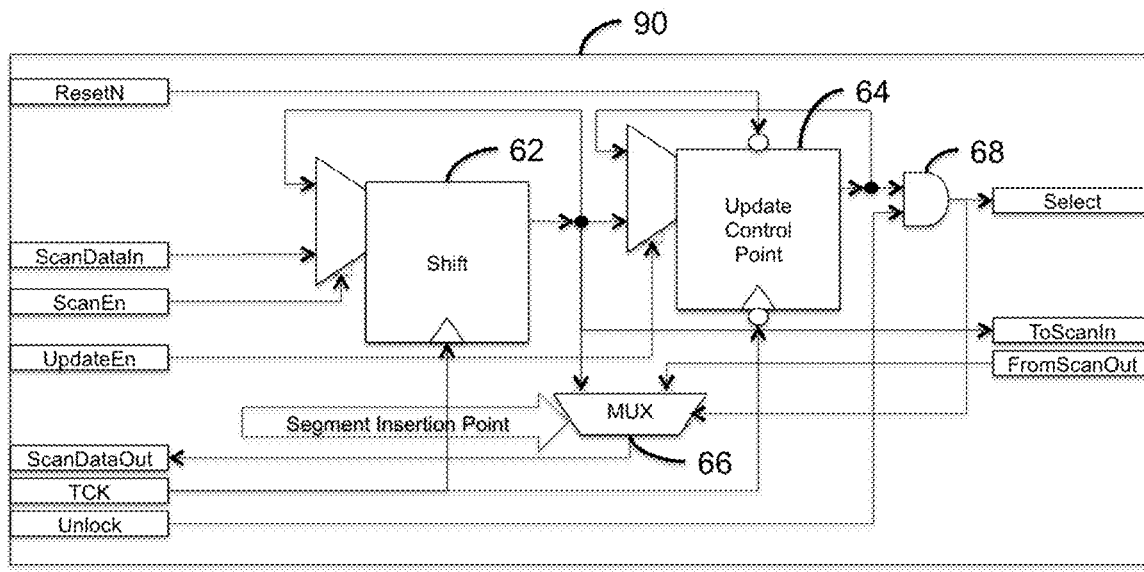
FIG. 9 depicts a SIB with a Select-signal-blocking feature to restrict access to a hidden scan path segment.

SIBs 60 can be modified to be used for security by providing a function that blocks either the update cell 64 from operating (see, FIG. 8), here illustrated as UpdateEn AND-gate 68; or by providing a function that blocks the Select signal from distributing the assert value regardless of the logical value held in the Update cell (see, FIG. 9), here illustrated SelectEn AND-gate 68. The function that prevents the secure SIB 80, 90 from operating can be viewed as an enable or a disable. Thus, one embodiment of a security-capable scan path insertion element can be viewed as using an unlock function which can be represented by an Unlock signal to enable operation.

Referring to FIG. 10, the SIB 101, 103, 105 is now represented as a scan path element that requires one or more Unlock signals. FIG. 10 shows a multiple-SIB scan network architecture 100, where multiple different Unlock signals, i.e., Unlock-0, Unlock-1, and Unlock-2, are required to enable access to the individual embedded instruments 72, 74, 76 behind each SIB 101, 103, 105. Specifically, to access Embedded Instrument$_2$ 76, requires that SIB$_2$ 105 be opened which further requires that the Unlock-2 signal be asserted.

Restricting the access to embedded instruments, registers, memories, or data by using a segment insertion method requires a feature or function to generate the Unlock signal or signals. The 'strength' or 'goodness' of the security scheme depends on how difficult it is to attack, break, or reverse-engineer the scheme used to generate the Unlock signal. For the security scheme to be considered adequate or sufficient, it must limit access to secure embedded objects for a significant portion of the chip's value-lifetime. The scheme must provide protection for the portion of the lifetime that the chip vendor is making a profit by having sales, i.e., to prevent counterfeiting, or for the portion of the lifetime while the chip is actively part of a system, i.e., to prevent denial-of-service or destructive-operation attacks. It is thought by many that even though it may take a physically long period of time to operate static key-based designs, that these are weak and easily broken, e.g., there is a finite probability that an attacker can randomly guess and apply the static key value in the first few guesses of trying to scan in bits to a register. It is thought that the more complexity that is added to the generation of an Unlock signal, or the requirement of multiple Unlock signals, the higher the difficulty in breaking the security. Note that with static keys, the key value must be presented to the IC from the outside and must be passed to the inside of the IC where it can be applied. This provides an opportunity for the key value itself to be the focus of the investigation as opposed to security circuitry hidden within the IC itself.

One method that can be used to generate Unlock signals is a time-varying code, also known as a 'dynamic code', a 'rolling code', or a 'internally generated code'. This can be a serial data value that is scanned into the scan architecture that uses an active process to modify or generate a data value that can be used to generate an Unlock signal. The data applied at the ScanDataIn (TDI) pin of the IC is not directly related to the data actually used, matched, or compared inside the IC. One embodiment of a rolling code generator is to use a linear feedback shift register ("LFSR") 110, i.e., a serial or parallel Type-1 or Type-2; other examples would be to use dividers or multipliers or even encryption values generated algorithmically—the main point being that the code must incorporate some time-varying, or cycle-varying process to minimize the possibility of capturing data applied to the pins and to then just repeat that sequence at a later time to break the security.

FIG. 11 shows an example LFSR 110 and illustrates how a function can be placed in the active scan path, between the ScanDataIn input signal and ScanDataOut output signal, to dynamically modify the data as scan data is shifted through the scan path. This configuration results in a self-modifying-data scan path that can be viewed as a code generation state machine. For the LFSR 110 example shown, if the ScanDataIn input signal was held to a logic 0, and the initial state or seed state in the three LFSR bits 112, 114, 116 was <100>, then each applied TCK would result in the following sequence of data values being present in the LFSR bits 112, 114, 116: <100→010→101→110→111→011→001→100> which repeats after 7 clocks since a 3 bit LFSR can only process $2^n-1$ values (for n=3, this is 7). If the ScanDataIn input signal was held constant at a logic_1, and also from an initial state of <100>, then the LFSR bits 112, 114, 116 would cycle through a different sequence: <100→110→011→101→010→001→000→100>. It can be seen that, for this applied polynomial, a set of state transitions can be mapped, for example from the <110> state, a logic_0 on the ScanDataIn input signal will result in a state transition to <111> and a logic_1 on the ScanDataIn input signal will result in a state transition to <011>. From this perspective, it can be seen that varying the input signal ScanDataIn will produce a state in the LFSR bits 112, 114, 116 that does not exactly match the input stream and therefore, the LFSR can be viewed as a code generation state machine with input dependent state mapping.

Figure 12:
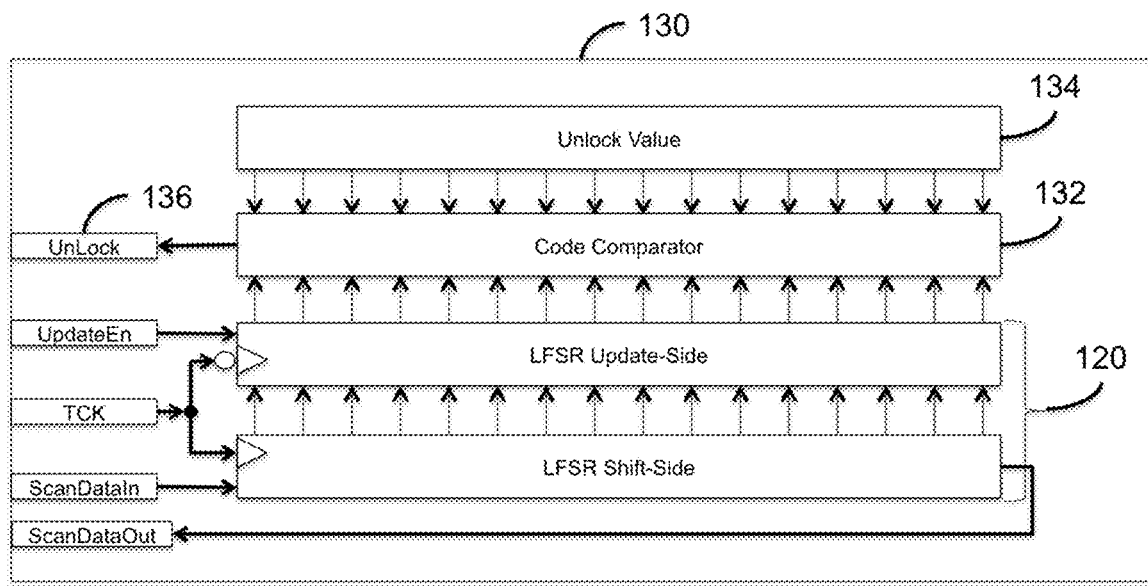
FIG. 12 depicts an LFSR containing an update-side coupled to a bit-wise comparator and a stored unlock value to generate an unlock signal.

The key variability items associated with an LFSR 110 for use as security are the length of the LFSR to provide $2^n-1$ states, the initial value or seed, the sequence of inputs to arrive at a particular state, and the polynomial implemented (shown here with XOR-gates 111, 113) that dictates the state transition sequences. An LFSR of this type can be viewed as an out-of-order counter that has a minimal next-state logic. These variability items can be viewed as the variables that must be discovered by a security attack, and these variables can be obfuscated in implementation to make it more difficult for an attacker to discover them. Referring to FIG. 12, to produce an Unlock signal 136, and to take advantage of the dynamic code for security purposes, the LFSR 110 must be coupled to a data comparator 132 and a secure matching value 134. The resultant unit can be called an unlock signal generator 130 that is comprised of two parts, a security code generation unit 120 and a code comparator unit 132, 134.

Figure 11A:
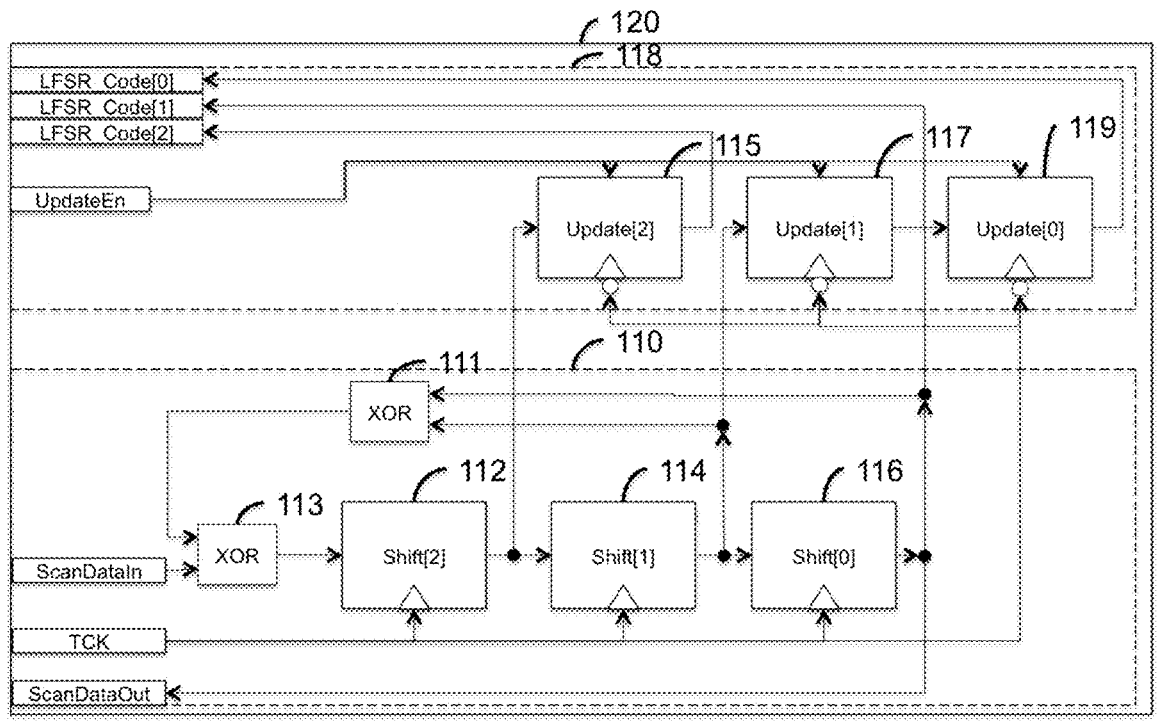
FIG. 11A depicts an example primitive polynomial Linear Feedback Shift Register (LFSR) that is coupled to an update storage register.
Figure 11B:
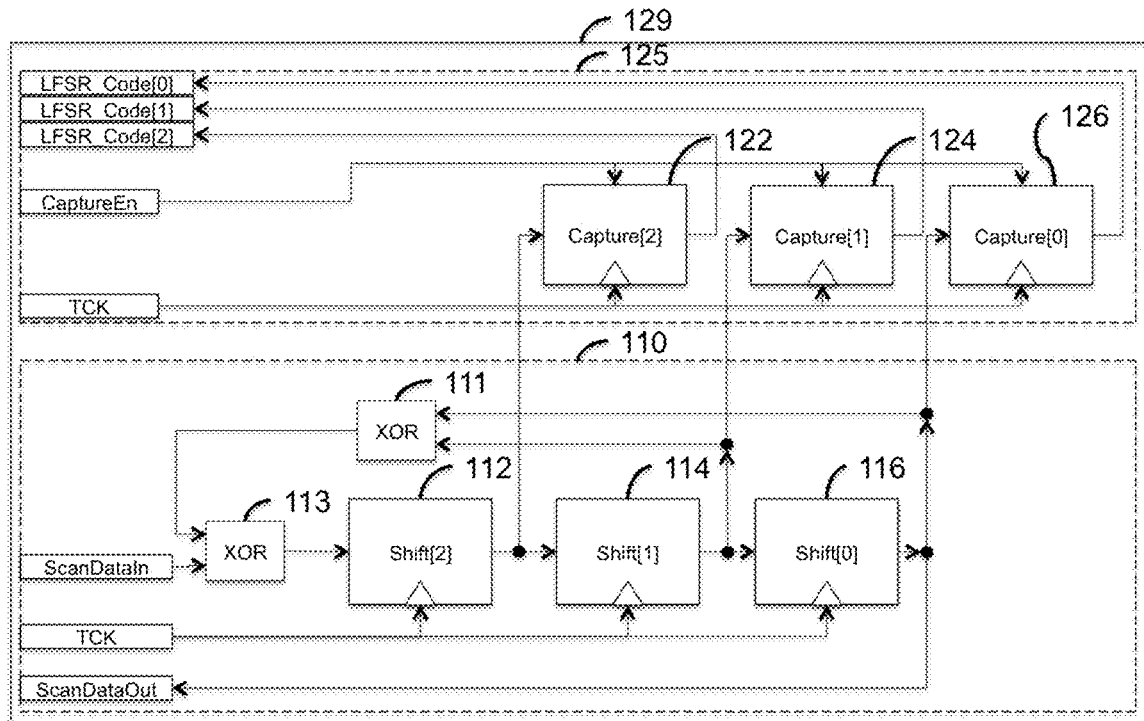
FIG. 11B depicts an example primitive polynomial Linear Feedback Shift Register (LFSR) that is coupled to a capture storage register.

FIG. 12 illustrates, in block diagram form, an unlock signal generator 130 according to some embodiments. Unlock signal generator 130 includes a code generator 120 coupled to a code comparator 132. The LFSR 110, as illustrated in FIG. 11, is just the shift portion of the circuit. To make the circuit usable in accordance with the JTAG operation protocol shown in FIG. 2, there must exist either an update portion 118 or a capture portion 125 that captures and holds the value of the LFSR shift-portion when the operator has completed a number of shift operations (see, FIG. 11A and FIG. 11B). Absent an update portion 118 or a capture portion 125, the LFSR 110 shift-portion is directly reflected to the comparator input portion 132 and an attacker may just keep applying shift operations continually until a state in the LFSR 110 matches the stored Unlock Value 134 by way of code comparator 132, thus generating the unlock signal and ultimately the target instrument's SIB unlocks, e.g., $SIB_2$ 105 in FIG. 10. By supporting an LFSR update-side 118 or comparator capture-side 125, the operator must conduct a finite number of shift-operations while in the Data Register side 22 of the FSM 20 and specifically, while cycling repeatedly through the Shift Data Register state, and then must stop and go through the Update Data Register state or the Capture Data Register state to transfer the value in the shift-portion of the LFSR 110 to either the update register portion 118 with update register bits 115, 117, 119, or to the capture register portion 125 with capture register bits 122, 124, 126. That value represents the state held in the LFSR bits 112, 114, 116, which is then compared to a stored or programmed Unlock Value 134, also referred to as a Match Value or and Unlock Match Value. If the value in the LFSR bits 112, 114, 116 matches the stored Unlock Match Value, then an unlock signal will be generated by the code comparator 132. The use of an LFSR update register 118 or a comparator capture register 125 requires that the LFSR 110 must stop the shifting process at some known cycle and must actually submit the transferred LFSR value to the code comparator to test against the stored value with the goal being to generate an unlock signal. An attacker could attempt to apply one cycle and submit it for code match and then apply one more cycle and submit it for code match and so on, but there are strategies that can be applied to likely make this untenable.

Figure 12A:
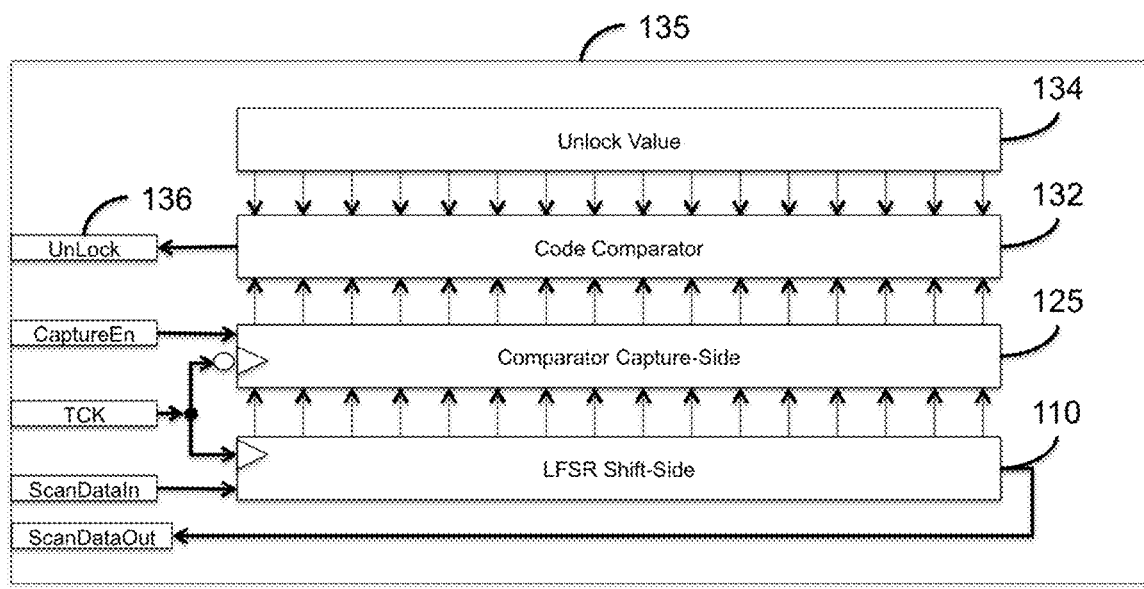
FIG. 12A depicts an LFSR coupled to a bit-wise comparator containing a capture register and a stored unlock value to generate an unlock signal.

FIG. 12 and FIG. 12A illustrates depictions of centralized security circuits 130, 135 where all of the elements are shown as being grouped together. In reality, the security function may also be distributed where there are portions of LFSR 110, 120 distributed throughout a scan chain and similarly, the code comparator 132 and Unlock Match Value 134 may be distributed throughout a circuit, as opposed to being stored in one physical place on the IC.

Figure 13:
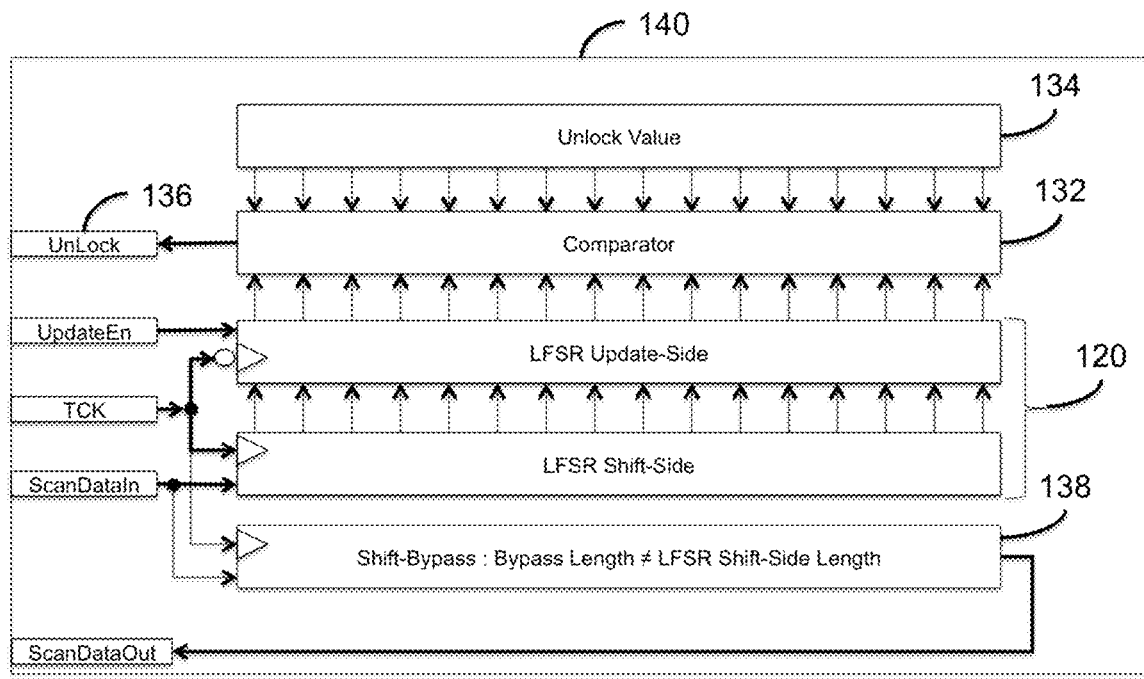
FIG. 13 depicts an LFSR containing an update-side and a bypass shift-register of a different length than the LFSR to obfuscate the LFSR operation coupled to a bit-wise comparator and a stored unlock value to generate an unlock signal.
Figure 13A:
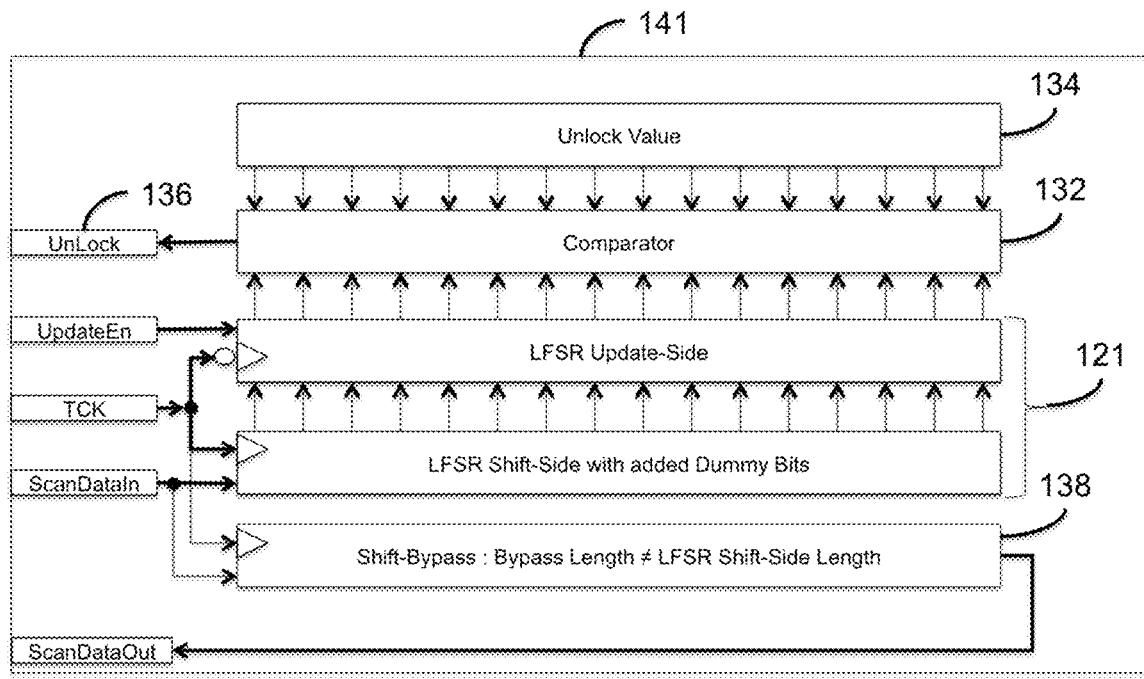
FIG. 13A depicts an LFSR containing an update-side with the addition of dummy bits and a bypass shift-register of a different length than the LFSR to mask the length of the operable LFSR and to obfuscate the LFSR operation coupled to a bit-wise comparator and a stored unlock value to generate an unlock signal.

However, there is a security weakness in the embodiments shown in FIG. 11, FIG. 11A, FIG. 11B, FIG. 12 and FIG. 12A. If the ScanDataIn input signal passes through the LFSR 110 as a self-modifying shift-register and continues on to the ScanDataOut output signal, even though the data is self-modifying by the nature of the LFSR-Shift circuit, a portion of that modified data sequence can be viewed by investigating the data sequence delivered to the ScanDataOut output pin and can be used to potentially reverse engineer the LFSR 110. One way to prevent this is to allow the original input shift data presented to the ScanDataIn input signal to pass back out through an unmodified shift register as an LFSR shift-bypass feature 138; and to have the shift-bypass register not be represented by a register that is the same length as the LFSR shift-side register 110. This hides the length of the LFSR so that polynomial look-up tables are not easily used to investigate the potential configuration statistics involved with the polynomial. FIG. 13 illustrates a modified embodiment of an LFSR shift-data modification circuit that includes an LFSR shift bypass register.

The LFSR shift bypass register 138 feature provides one level of obfuscation by hiding of the variability items of the length of the LFSR, the initial value or seed of the LFSR, and the polynomial implemented for the LFSR. It must be noted that the use of a bypass shift register in conjunction with an algorithmic code generator can be applied to any type of code generator such as a counter, divider, multiplexor, encryptor, decryptor or any unit that would modify a data value as it passes through the unit.

Figure 14:
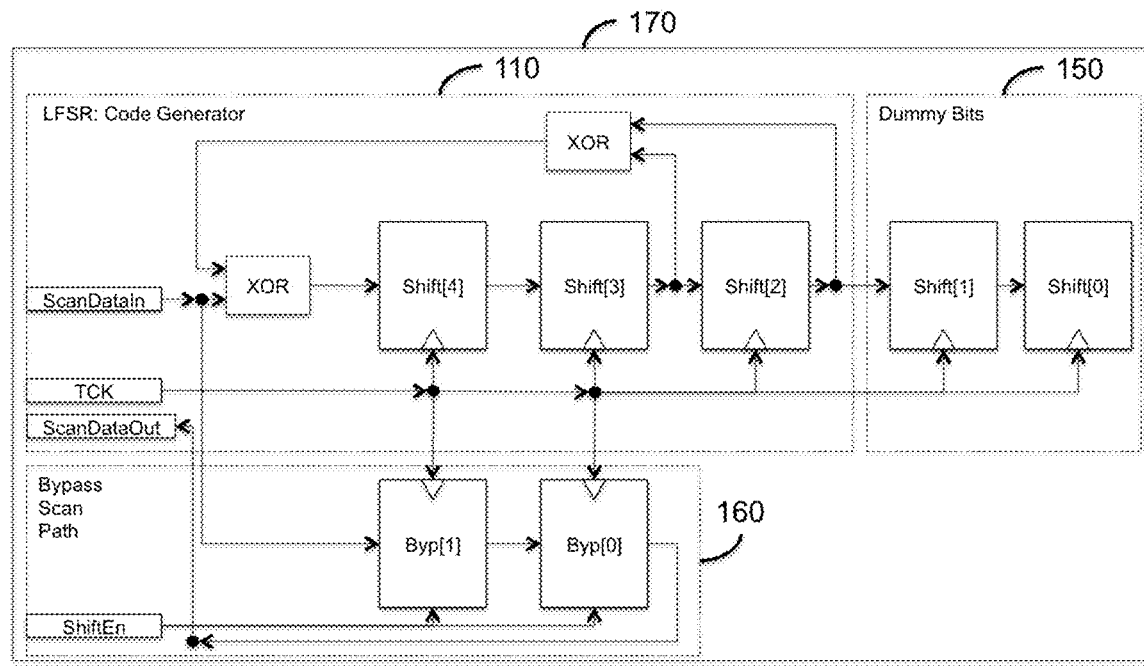
FIG. 14 depicts a LFSR that includes dummy length-spoofing bits and a bypass shift-register of a different length than the LFSR to obfuscate both the LFSR operation signature and the LFSR length from side-band investigations.

Hiding or obfuscating the configuration statistics of the code generator (LFSR 110) is one of the main strategies of obfuscating the selection of the state that will generate the Unlock signal. One of the attack methods that can be used to try to find the length of the LFSR, and to subsequently guess or investigate the feedback taps that represent the polynomial, is to use a side channel attack such as thermal imaging while the LFSR is active. According to one embodiment, this side channel attack may be avoided by obfuscating the length of the LFSR. One method of obfuscating the length of the LFSR is to add active toggling bits 150 to the beginning or end of the LFSR 110 that do not factor into the polynomial or the feedback. FIG. 14 illustrates an exemplary embodiment of adding toggling bits, also known as dummy bits 150, to the end of the LFSR 110 and while simultaneously also supporting a shift bypass function 160. Adding dummy bits 150 to circuit 170 provides the impression of a 5-bit thermal or power image when, in fact, the functional circuit is a 3-bit LFSR 110 with a 2-bit scan data path extension.

The ScanDataIn connection allows data to enter both the LFSR 110 and the Bypass shift register 160. The ScanDataOut signal sources from the original and unmodified data presented on the ScanDataIn that passes through the Bypass shift register. The input scan data will be seen as output scan data after the number of TCK cycles that represents the length of the bypass shift register segment 160, making an observer believe that that portion of the scan path that represents the LFSR 110 is represented by the length of the LFSR bypass register segment 160. The LFSR 110, however, is actually a different length and if a heat or power signature is investigated, then it will also seem to be a length that is different than the actual operable. The LFSR bypass register can be separate and parallel as shown in FIG. 14. Alternatively, the LFSR Bypass register can be appended as the dummy bits on the end of the LFSR, i.e., bits Shift[1] and Shift[0] also shown in FIG. 14. An alternate embodiment may include a SIB providing access to the LFSR 110 circuit. The opening of the SIB may provide an input pathway to the LFSR 110, but according to this alternate embodiment, the scan data continues to pass through the existing ScanDataIn and ScanDataOut signal pathways of the SIB 60 (see, FIG. 6).

Figure 15:
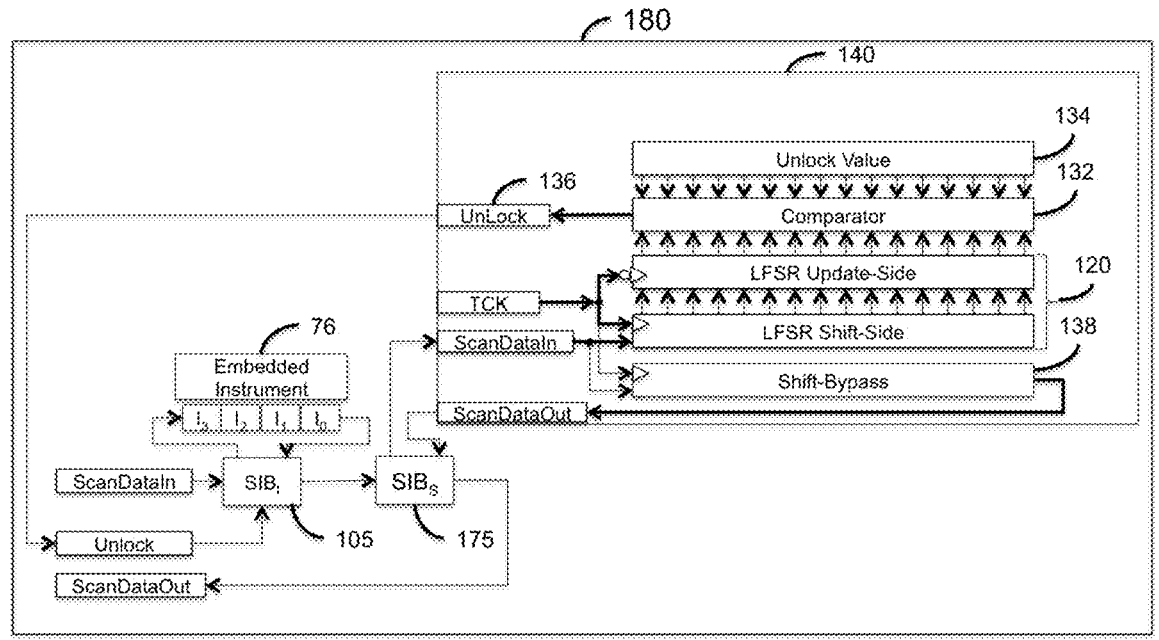
FIG. 15 depicts the LFSR-coupled-to-the-comparator unlock signal generator unit coupled to the IEEE 1687 multiple SIB network to illustrate both the generation and coupling of the unlock signal to a given SIB and the SIB-based access to the unlock signal generator.

Combining of any of the embodiments shown in FIG. 12, FIG. 12A, FIG. 13, or FIG. 13A, with FIG. 10 results in a complete circuit that may be configured so as to provide security can be made even more difficult to reverse engineer. The operation of the circuit may add additional security. According to one exemplary embodiment, an unlock generation security circuit 130, 135, 140, or 141 is placed behind a SIB 60, 80, 90. The assertion and de-assertion of the SIB 60, 80, 90 may also be tied to the enabling of the Unlock signal. Alternatively, the assertion and de-assertion may be tied to the reset value or default value of the LFSR's update-side or capture-side, and possibly to reset the shift-side as well. FIG. 15 shows one possible embodiment that uses unlock signal generation unit 140 that is accessible behind a security SIB, here illustrated as $SIB_S$ 175. The unlock signal generation unit 140 is coupled to the secure access of Embedded Instrument 76 through an instrument SIB, $SIB_1$ 105, by providing an unlock signal 136. This constitutes a complete security circuit 180.

Figure 16:
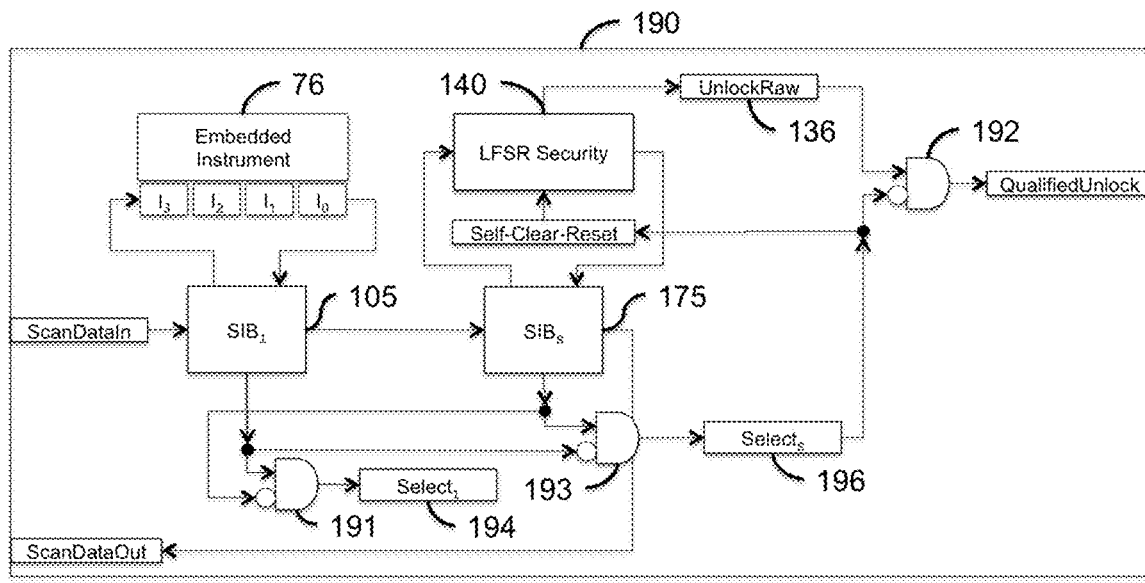
FIG. 16 depicts the code generation unit and unlock signal generator unit combined into an LFSR security unit and accessed serially through a SIB with the SIB's Select signal generating a self-clearing reset signal whenever access is granted and providing qualification to the unlock signal when the SIB is closed.

FIG. 15 illustrates an example embodiment of a complete security circuit 180 where a method of operation may be applied to make the reverse engineering of the security operation sequence more difficult for an attacker. In this embodiment, $SIB_S$ 175 must be opened to operate the unlock generation unit 140, and if operated properly, the comparator 132 will assert an unlock signal 136. However, FIG. 16 shows that the unlock signal 136 does not become valid until the security SIB (SIB$_S$ 175) is operated to a closed configuration. After SIB$_S$ 175 is closed during the Update Data Register state of the FSM 20, the subsequent following shift operation that occurs in the next arrival and looping at the Shift Data Register state and then the next following update operation in the Update Data Register state will allow the target instrument SIB (SIB$_I$ 105) to be opened. An example embodiment of a qualified unlock signal generation unit 190 is shown in FIG. 16 and links the generation of the raw unlock signal, UnlockRaw 136, to the security circuit SIB's Select signal, Select$_s$ 196, to create a qualified unlock signal, QualifiedUnlock, which is shown through an AND-gate 192 that passes the UnlockRaw 136 signal only if the Select$_s$ 196 signal is deasserted (logic 0). In a similar manner, the instrument SIB (SIB$_I$ 105) must be closed before the security circuit SIB (SIB$_S$ 175) can be opened and operated again. This is accomplished by taking both of the Select signals directly from the SIB update elements of the SIBs 105, 175 and factoring them both into the Select signals used to open and close the individual SIBs 105, 175—this forces the SIBs 105, 175 to be mutual-exclusive in operation such that only one can be open at a time. Upon opening SIB$_S$ 175, the value held in the update-side 118 of the LFSR will be reset to a default value (or one of many selectable or sequence-able default values), which will cause the code comparator 132 to not match the Unlock Value which will de-assert the Unlock 136 signal. The reset action will be triggered by the Select$_S$ 196 signal changing from de-assert to assert, which happens on the falling-edge of TCK when the FSM 20 is in the Update Data Register state, and the reset operation (signal assertion) will self-clear before the FSM 20 reaches the rising-edge of TCK leaving the Capture Data Register state after passing through the Run-Test-Idle and Select Data Register states.

Optionally, the entire register structure (shift-side and update-side 120, and LFSR bypass 138) can be set to a default state instead of just applying reset to the update-side (as is the minimum required by the JTAG standard). FIG. 15 shows an embodiment where one dynamic shift-data unlock generation security circuit 140 can create one Unlock 136 signal that can be associated with one secure embedded instrument 76 through an instrument SIB 105 access. To make a complete circuit or secure instrument network 240, shown in FIG. 17A, there may be as many security circuits 250, shown in FIG. 17, as there are embedded instruments 100 (72, 74, 76). Hierarchy may also be supported in that one security circuit 130, 135, 140, or 141 can be used to allow a SIB$_S$ to be unlocked to get access to another security circuit—this feature is shown as the LFSR Security-S block that generates the unlock signal, Unlock-S, to allow individual security SIBs to be unlocked and opened within the security block 250.

Figure 17:
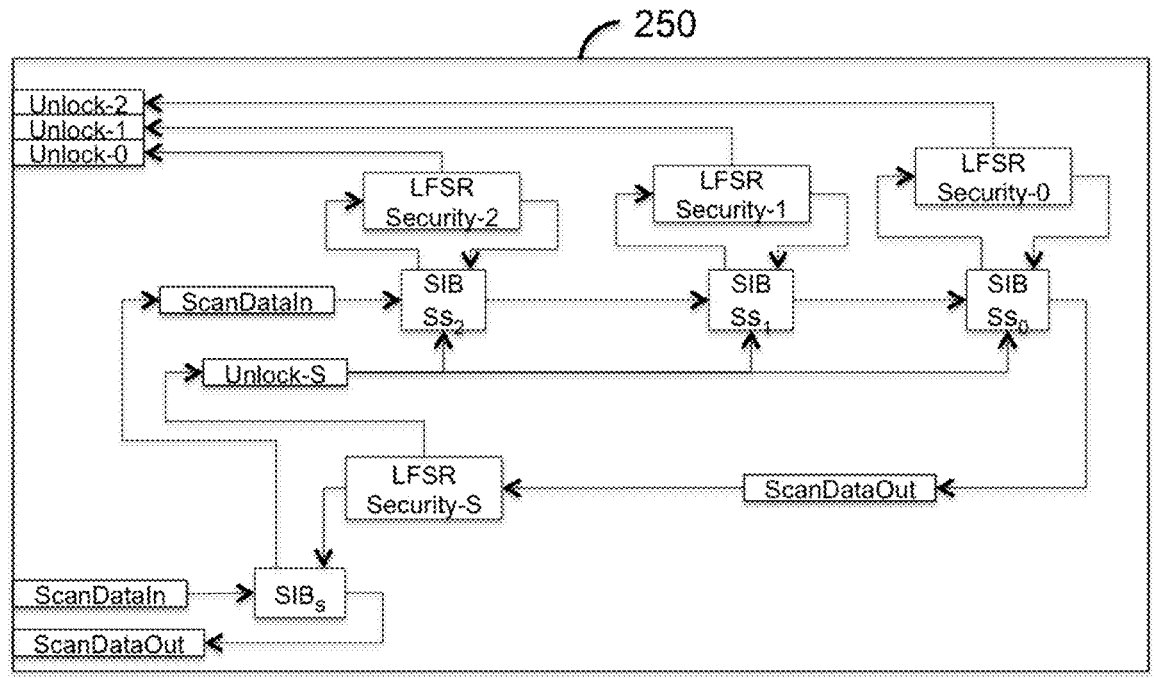
FIG. 17 depicts a plurality of unlock signal generation units creating individual unlock signals and accessed through secure SIBs that require an unlock signal from a separate security unlock signal generation unit.
Figure 17A:
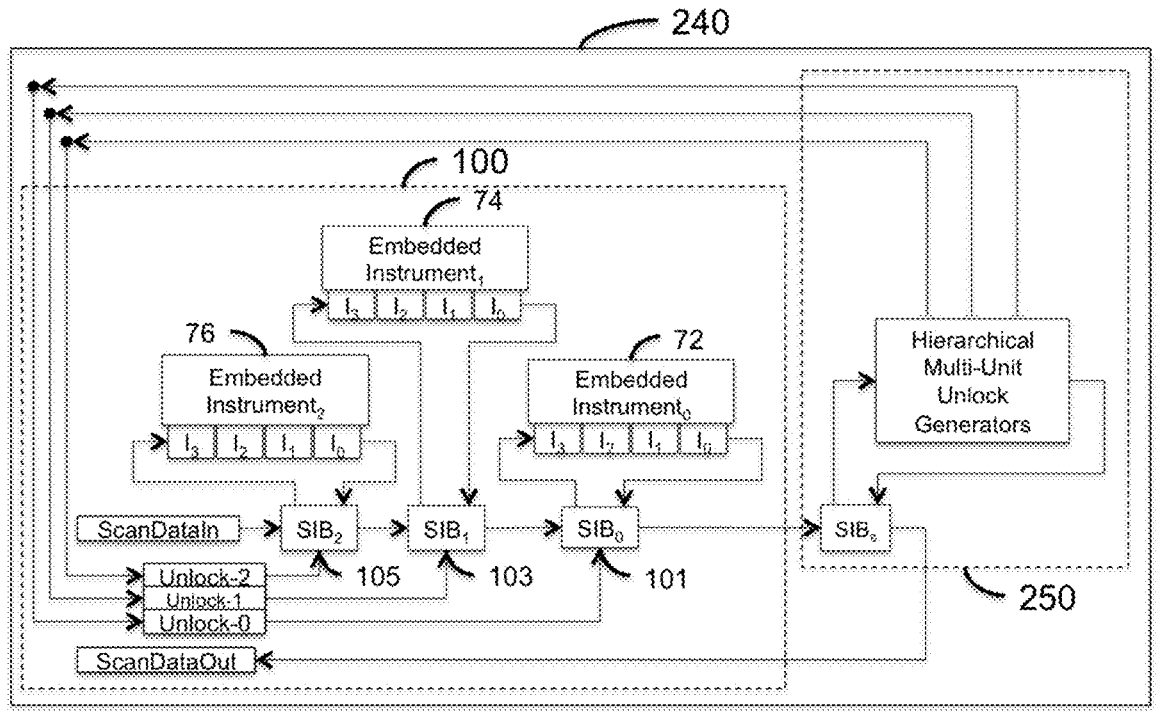
FIG. 17A depicts a plurality of unlock signal generation units individually coupled to a plurality of hidden instruments through their secure SIBs.

FIG. 17A illustrates an example of a serial scan path configuration 240 with 4 top-level SIBs that access 3 different embedded instruments 72, 74, 76 and the security circuit 250. Once the security circuit SIB is opened, then there is access to multiple SIB protected security circuits that contain the embedded LFSR code generators 120, Unlock Value code comparators 132, 134 and unlock signal 136 generators such as those described in FIG. 13. The scan path, when a security access SIB is opened, must be operated correctly to generate an Unlock signal 136. The security access SIB must then be closed before the Unlock signal 136 is qualified and delivered to the SIB (105, 103, or 101) that accesses the related embedded instrument (76, 74, 72, respectively). For example, LFSR Security circuit number 2 (LFSR Security-2) can only provide an Unlock signal, Unlock-2, to open embedded instrument access SIB number 2, SIB$_2$ 105. A qualification signal can also be produced by embedded instrument access SIB$_2$ 105, such that SIB$_2$ 105 must be closed before the security access SIB S$_2$ can be opened. The operation of opening of the security access SIB S$_2$ generates a temporary reset pulse, as opposed to a constant reset signal, that will reset (place a default value) in the LFSR Security-2 update-side register. This will result in the clearing out of the comparator value and therefore, the Unlock signal will de-assert—which requires the correct operation of the security circuit to enable opening of the embedded instrument access SIB$_2$ 105 if needed (the Unlock signal is not persistent throughout all operations, it must be opened each time that SIB$_2$ 105 needs to be accessed).

It must be noted that in general, once a security circuit is operated and an Unlock signal is generated, and then the security access SIB is closed, the Unlock signal will remain asserted until the security access SIB is accessed again (the act of opening the security access SIB will de-assert the Unlock signal). This may not be the required secure behavior. There may be a need to limit the number of clock cycles or amount of time that the embedded instrument remains accessible. In this case, the Unlock signal generated by the security circuit may also be further qualified by a counter or some other form of 'time framing'. For example, the Unlock signal may be asserted, then the instrument access SIB 105, 103, or 101 operated to allow access to the embedded instrument, and then there may be a time period or clock-cycle count limit of, for example, 100,000 TCK's and then the Unlock signal will automatically de-assert which could remove the Select signal from the embedded instrument access SIB 105, 103, or 101, which freezes the embedded instrument interface and effectively closes the SIB 105, 103, or 101.

It must be noted that the examples shown, FIG. 15 and FIG. 17, imply that there is one security circuit per one hidden embedded instrument. Other embodiments may have multiple security circuits, meaning multiple Unlock Match Values, in order to provide access to just one hidden embedded instrument. And conversely, a different embodiment may use one security circuit to provide access to multiple hidden embedded instruments.

Another issue that may occur with a security circuit is if there are manufacturing defects, errors, or other types of failures that can occur and can prevent correct operation of the security feature (for example, either it never produces an unlock signal, it does not process the correct state and so does not produce the unlock signal for the correct input or in the expected number of clock cycles, or in the worst case, it produces an unlock signal constantly regardless of whether the correct or incorrect operation is applied). The expected error behavior can be estimated in the same manner that fault coverage is produced by automatic pattern generation tools ("ATPG"), by placing single faults, i.e., stuck-at, transition-delay, path-delay, etc., on the various gate elements or nets of the security circuit and to evaluate the expected incorrect behavior. A failure modes and effects analysis is restricted to only being accomplished by a trusted individual that has access to a description of the exact security circuit—this type of simulation debug with access to the design description can only be done when the security circuit is still in the design or prototyping process, or in the manufactured test process within the same company or organization or within a trusted organization that has access to the design description. A type of debug and diagnosis can be implemented in the physical silicon to view the design circuitry variables by including a feature in the security circuit to present data concerning the circuit under some known identified circumstances—however, the data produced must be as difficult to access as the security circuit's protection of the embedded instrument itself.

Figure 18:
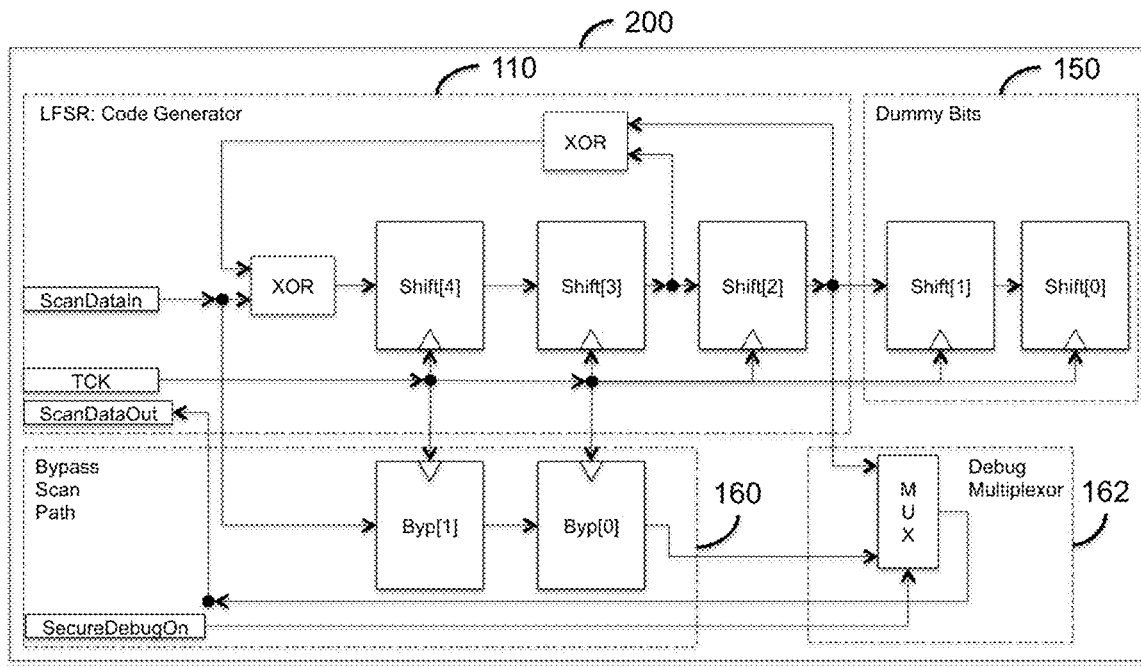
FIG. 18 depicts an LFSR code generator that supports a secure debug multiplexor that is configured using a Secure-DebugOn signal to allow the end bit of the true LFSR to be viewed for debug purposes.

Note that the example code generation portion of the security circuit shown in FIG. 11, FIG. 11A, FIG. 11B, FIG. 12, and FIG. 12A allows the shift data from ScanDataIn to pass through the actual LFSR 110 circuit, not the bypass 160 or through the dummy elements 150 as shown in FIG. 14. This allows the last bit of the actual LFSR 110 circuit to be passed on to ScanDataOut and to be viewed externally. FIG. 18 illustrates one embodiment of this type of feature, providing the last bit of the LFSR for viewing in an LFSR 110 that supports a bypass scan path. The ability to view the last bit can be added to the LFSR circuit 110 by placing a signal viewing connection to a multiplexor 162 on the output of the last bit of the actual LFSR 110 register and to route that connection to the ScanDataOut signal connection. This requires a new signal to be brought into the code generator circuit 200, the SecureDebugOn signal.

However, viewing the last bit of the LFSR 110 may not provide enough information to resolve the design problem, fault or defect. Many LFSR or other code generation elements may provide the same sequence of values through the last bit, and therefore would mask the source of the erroneous behavior. If the LFSR circuit 110 has an initial state, polynomial, and length that produces a similar result in the last bit as some other LFSR configuration with a different initial state, or a different polynomial, or a different length—then it may be difficult to conduct debug and diagnosis to establish the exact nature of the error. In fact, some defects and faults may produce little or no data—for example, if the output of the last bit in the LFSR (the bit driving the ScanDataOut during the debug process) is stuck-at-0, then the data seen on ScanDataOut will always be a logic_0—this would be true no matter what the configuration or implementation of the security circuit.

Figure 19:
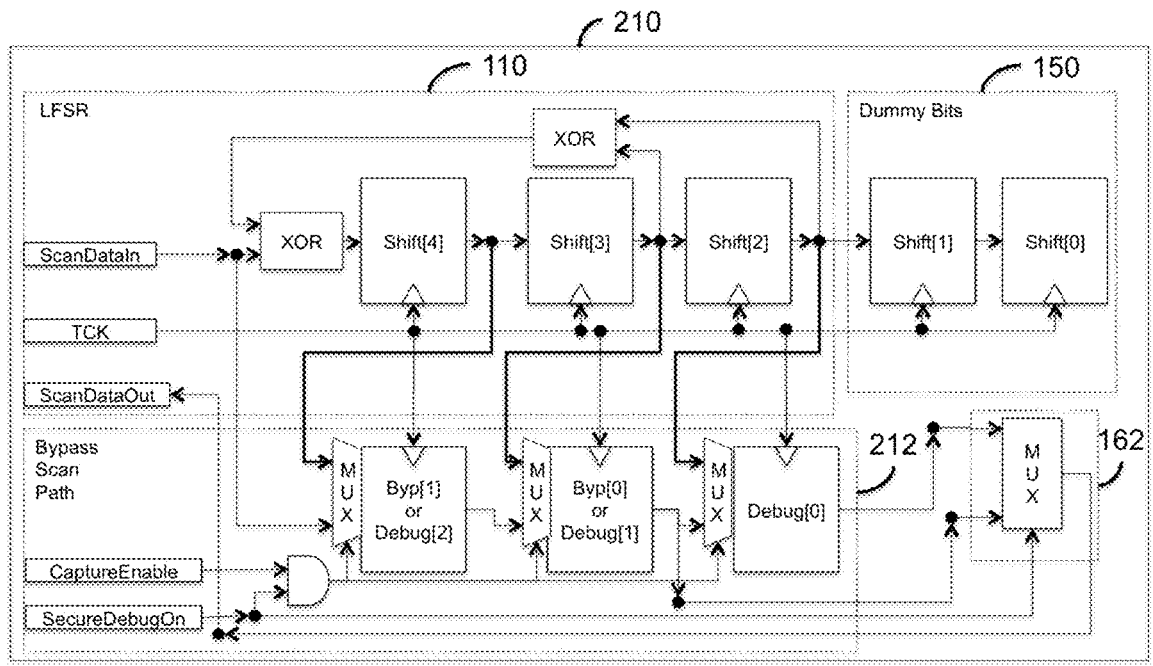
FIG. 19 depicts an LFSR code generator that supports a debug multiplexor and a bypass capture function to allow the entire state of the LFSR to be captures and viewed in a serial shift manner by use of a SecureDebugOn signal and a CaptureEnable signal.

A better, debug and diagnostic configuration would be to allow the state of the code generation LFSR 110 itself to be viewed in total. FIG. 19 illustrates an embodiment where the LFSR bypass register 212 can be expanded and used to capture the LFSR state 110 by supporting a CaptureEnable signal and this captured LFSR 110 state can then be shifted through the debug multiplexor 162 to be viewed as serial data on the ScanDataOut signal. Whereas providing the last bit of the LFSR 110 to the ScanDataOut signal does require knowledge of the security circuit and data analysis on the output stream to discover the source of the failing indication—providing the entire state of the LFSR 110 makes the debug and diagnosis effort easier and faster, but can provide, as data output, a great amount of information about the security circuit that should be kept secret. To this end, placing the code generation portion 210 of the unlock generation security circuit into the configuration to enable debug operation should be as difficult in security terms as the actual access and operation of the security circuit to enable access to an embedded instrument.

FIG. 19 illustrates an example embodiment of a debug mode for the security circuit. The LFSR 110, in this case are the 3 bits LFSR[4:2]; to provide LFSR obfuscation, 2 dummy bits 150 have been appended to the end to make the LFSR 110 seem to be 5 bits long to an investigator (LFSR bits, LFSR[1:0]) that may be sensing a thermal or power image. To conduct an actual capture, the bypass circuit 212, consisting of only the 2 bits, Byp[1:0], to again make an investigator that is looking at the data exiting the IC device pins think that the register involved with security is only 2 bits long—needs to have one more bit added to make it the same size as the actual LFSR register circuit. This then turns the bypass, Byp[1:0] into the 3 bit Debug[2:0] register. The other change is that the bypass register 212 and any added extra debug bits must now support capture. However, the capture operation can only be allowed when the security circuit has been enabled to be in a secure debug mode by the assertion of the SecureDebugOn signal. Also not shown, to minimize complexity of the diagram, but for clarity, all registers receive the ShiftEn signal. Since the assertion of the SecureDebugOn signal is required for the shifting of data to extend to any extra debug bits, then it is optional to also block the ShiftEn to any added debug bits so that they will not appear on any thermal investigations during normal security operation.

Figure 20:
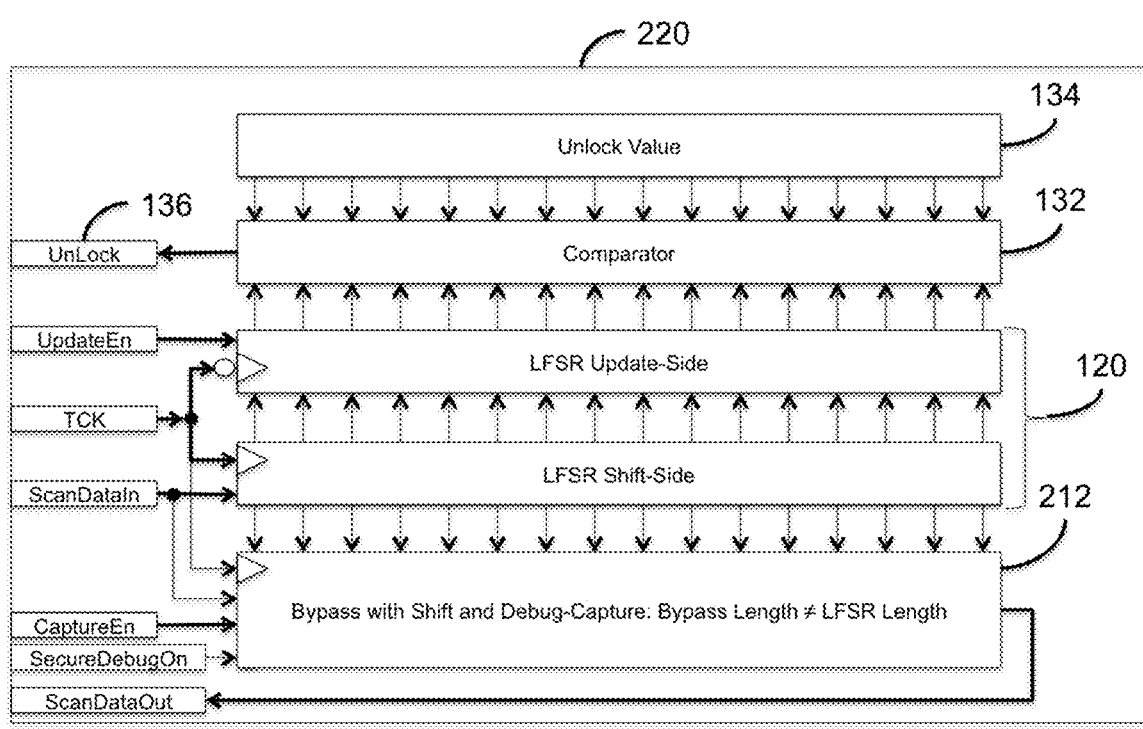
FIG. 20 depicts a block diagram of an unlock generation unit where the LFSR code generation portion of the unit supports secure debug with a shift-and-capture bypass register.

FIG. 20 depicts a complete unlock generation portion of a security circuit 220 that couples a code generation portion 120, that supports a debug portion and a SecurityDebugOn input signal, with a code comparator portion 132 and an Unlock Value portion 134, such that proper operation will produce an UnLock signal 136.

Figure 21:
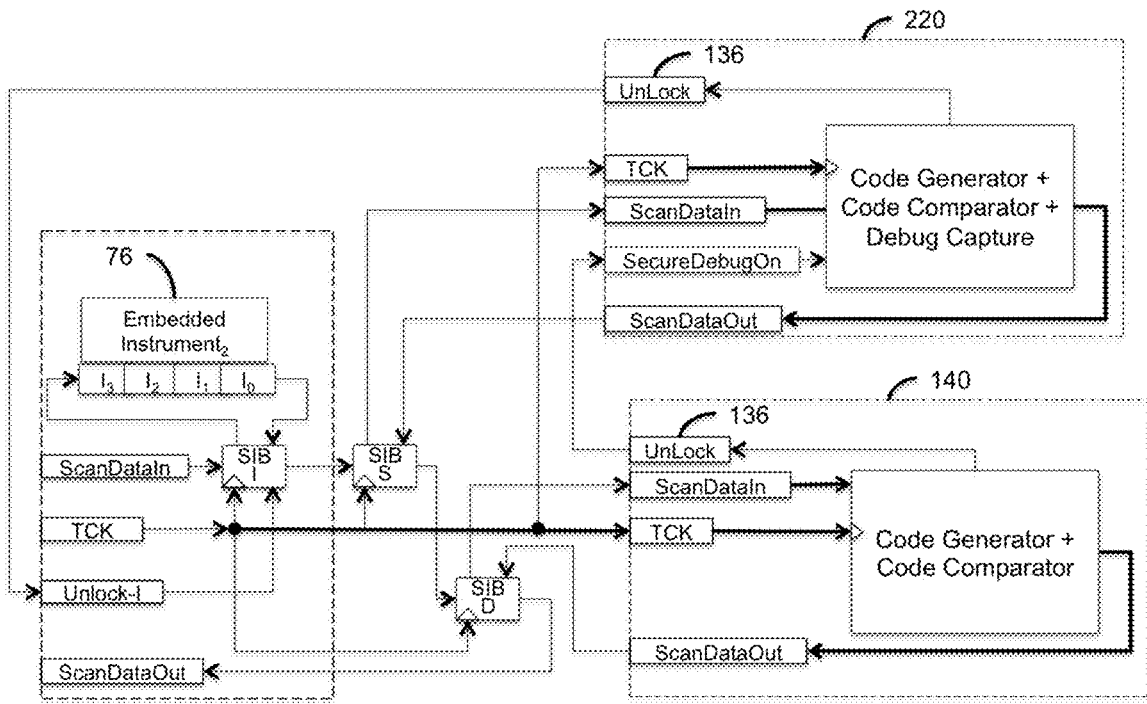
FIG. 21 depicts in block diagrams the use of a debug unlock generation unit to create the SecureDebugOn signal of an instrument unlock generation unit to enable debug operations of the instrument unlock generation unit.

FIG. 21 illustrates one embodiment of an unlock generation portion of a security circuit 220 that supports a physical debug portion and that includes a second unlock generation portion of a security circuit 140 that must be operated in order to assert a secure debug enable signal (SecureDebugOn). The instrument unlock generation portion 220 is accessed through SIB S and the debug unlock generation portion 140 is accessed through SIB D.

To ensure that the security circuit cannot be easily investigated by placing it into a debug configuration, the SecureDebugOn signal should itself source from a security circuit that is rated to be at least as difficult in security metric as the security circuit being debugged. This means that the 'time-to-break' statistics of the security circuit that creates the SecureDebugOn should be equal to the statistics of the security circuit receiving the SecureDebugOn signal. By way of example, if the security circuit being debugged has a 39 bit LFSR and requires 141-bits of data to be applied to achieve the correct state, then the security circuit used to create the SecureDebugOn signal should be of equal or greater complexity, such as a 41 bit LFSR and 166-bits of data to be applied. Note to minimize overhead cost, it may be that only one secure debug enable circuit is used to enable all of the security circuits that may be on a chip—if, for example, an addressing scheme of some sort is supported to allow selection of a selectable target security circuit.

If the IC has been delivered to an end user and does not seem to work in the board or in the socket—and seems to not work because of either the test and debug security circuit itself, or some interaction with the test and debug security circuit—then the end user may contact the chip provider to conduct debug. The solution may be to conduct a remote debug where the chip provider tells the end user what tools, setup, and sequence of events to use. However, to prevent the end user from gaining too much information from the exchange, then it may be advisable to provide further data encryption or data obfuscation to mask the true nature or information associated with the data exiting the chips TDO (ScanDataOut) pin.

Even though the security circuit has the effect of obfuscating the data involved with operation of the security circuit (the LFSR hides the true nature of the data scanned into the part), there may be a need to add further data obfuscation.

During a debug session, there is a need to open the security circuit and to then provide direct access to the various hidden variables such as: the real length of the LFSR, the correct applied data sequence, the initial state or seed, and the polynomial mapping. With the debug capability open, the data applied to the outside of the chip, and the data received from the inside of the chip will then carry this information concerning the security circuit. Hiding the true nature of the meaning and applications and operations associated with the vectors applied to the outside of the chip, may require that a secondary internal data obfuscation circuit exist—or may require that an internal embedded function exist to analyze and calculate the most probable error. In any case, the data exiting the TDO pin of the part should not accurately represent what is occurring inside the chip.

FIG. 20 shows the security circuit with included secure debug function. If for some reason, the embedded instrument to be accessed cannot seem to be accessed, then it may be suspected that the Unlock signal is not being generated. To investigate, the target security circuit is placed in secure debug mode (SecureDebugOn is asserted). The code generation circuit 120 is then evaluated by first capturing the initial state, which is then scanned out of the IC for comparison to the correct initial state to see if the correct seed resides in the LFSR code generation register 110. The code generation circuit 110 is then operated using the correct input sequence and using the correct number of clocks and the state of the LFSR register 110 is then captured using the debug circuit 212 and scanned out of the IC for evaluation. If the resultant state is incorrect, then the security circuit may be operated with the application of various debug algorithms—for example, a binary search where the LFSR 110 is operated halfway to a complete operation and then its state is captured by the debug register 212 and scanned out through the ScanDataOut signal. This state represented as data can be compared to a simulation value or to the same value of an identical device that is working correctly. If the result is correct, the code generator is operated forward halfway to the end result; if the result is incorrect, then the LFSR 110 is operated from the beginning to one-quarter of the way and checked again. This continues until the cycle that produced the error and the first error state is found. Note that this sequence of operations in one embodiment of the code generator 210 may include additional control of the TCK that goes to the LFSR 110 only to allow the scan shift out of the capture-bypass portion of the circuit without causing further state changes within the LFSR register 110.

FIG. 21 illustrates a Unlock signal generator security circuit 140 that can be accessed behind SIB$_S$, and operated to generate the SecureDebugOn signal for the Unlock signal generator security circuit 220 that is used to create the Unlock-1 signal that provides access to the embedded instrument 76 through the instrument SIB$_I$. The LFSR length, the polynomial, the seed value, and the operation stream for the debug-enable security circuit should not collectively be identical to the security circuit that is the target for the debug-enable security circuit. The difficulty in breaking the security of the debug-enable security circuit should, however, be similar or greater than that of the instrument-access-enable security circuit.

Figure 22:
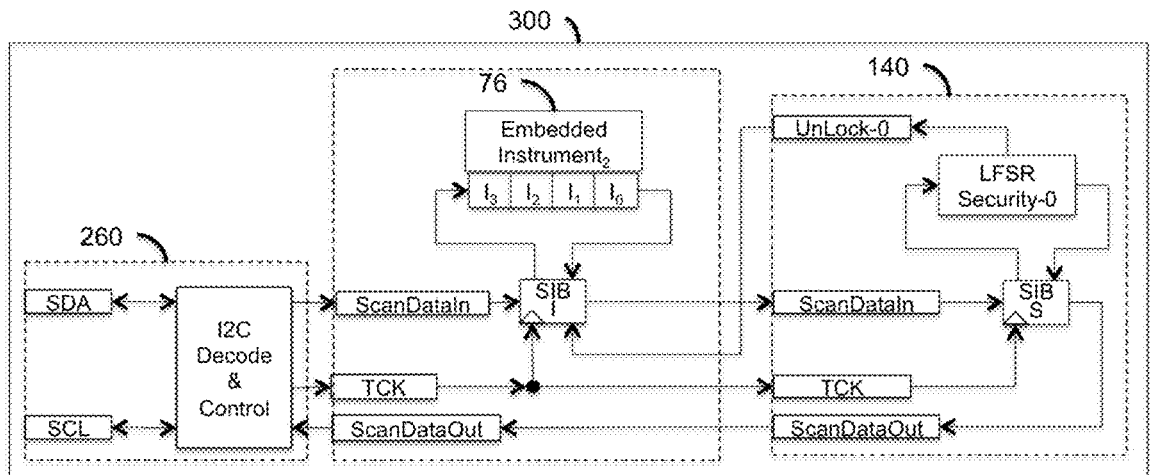
FIG. 22 depicts the access of the overall test, debug, and security architecture by a non-JTAG alternate interface and controller, the I2C device pin interface and controller.

It must be noted that even though the embodiments described here have been largely IEEE 1149.1, IEEE 1500 and IEEE 1687 type of architectures, the techniques described may be applied to any on-chip interface and controller and register access architecture. For example, the Inter-Integrated-Circuit (also known as I-Squared-C or I2C) architecture 260 is comprised of a two signal set of port connections, SDA for data and SCL for clock—and both signals can be bidirectional (since both data and clock may be sourced or sinked from an I2C master unit). The I2C pin protocol is decoded to define operations—both signals are defined to be pulled-up to a logic 1 when not actively driven—when the SDA is brought low (logic 0) while the SCL is held high, this is a Start Condition. Thereafter SDA can only be brought low while SCL is low—and this represents data—and after 8 bits (a byte packet) either an Acknowledge or a Stop Condition must be conducted (Stop is bringing SDA high while SCL is held high). The data transfer actions are further defined as Address, R/Wbar commands, and Data. The hardware architecture, once past the protocol decode and controller portions, can be a serial scan data architecture as has been described throughout this document and the input data from the SDA port can be used to operate the time-varying embedded code generator that can be used to enable access to hidden scan paths that contain embedded instruments. FIG. 22 shows an example embodiment of complete secure architecture 300 that includes an I2C chip interface and controller 260 that can operate a hidden instrument 76 and an unlock signal generation security circuit 140 to gain access to the hidden instrument (note that, for clarity of the diagram, the CaptureEn, ShiftEn, UpdateEn, and Reset signals are assumed to be provided, but are not shown).

It must also be noted that the unlock signal generator security circuit 140 can be coupled to the embedded item to be hidden through SIB's as described, or the security circuit can be selected by an instruction such as for 1149.1 or for 1500, while the embedded instrument is selected by a different instruction and can only be successfully selected if the security circuit has been selected first and operated correctly. Similarly, to the described mutually exclusive SIB circuits 105, 175 in FIG. 16, when the instruction to select the security circuit is installed and updated, then the security circuit will first go through a reset before enabling any capture or shift operations.

Figure 23:
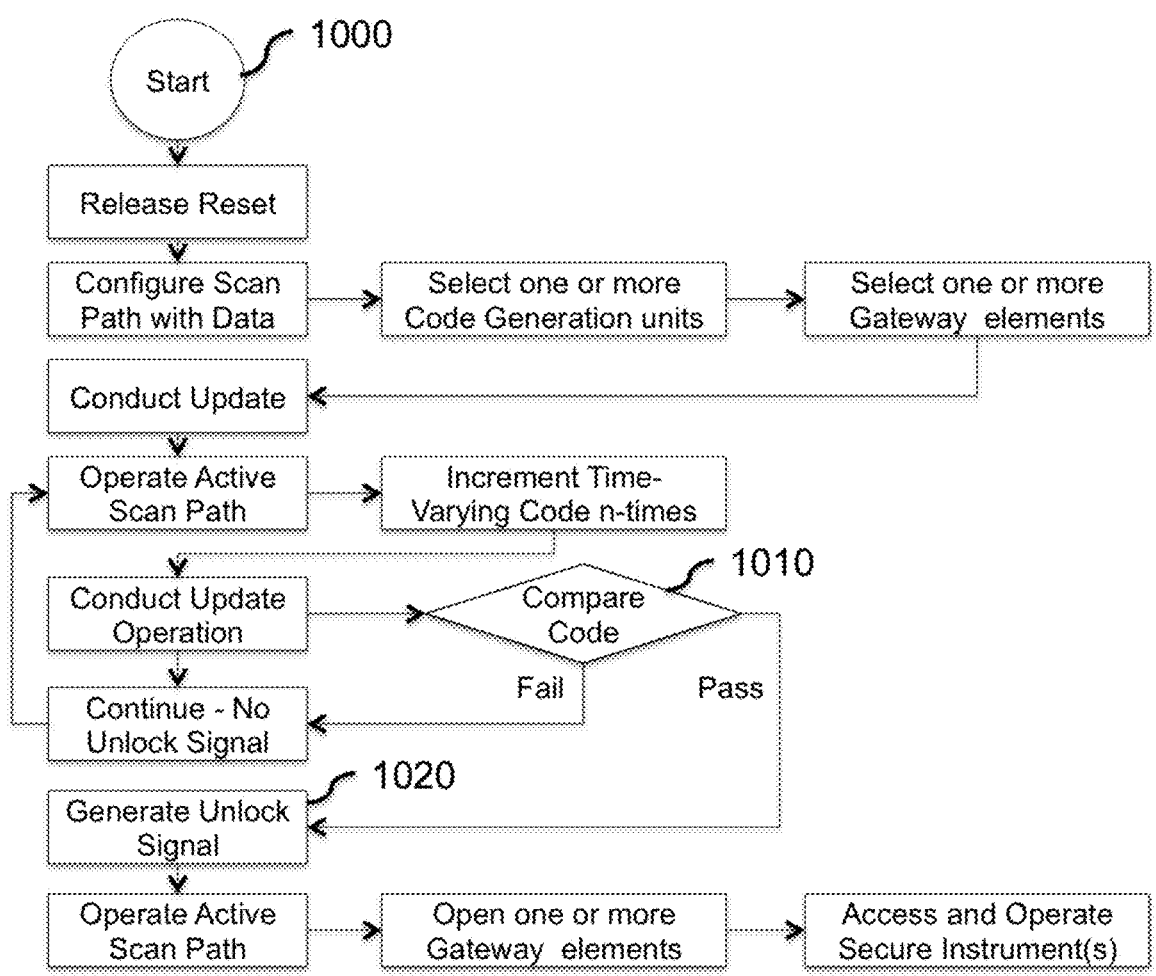
FIG. 23 depicts a flowchart that describes one method of operation that combines the hardware elements of scan path, gateway elements, code generator, code comparator, and unlock signal generator in a manner to enable access to embedded secure instruments.

FIG. 23 illustrates a method of use of the elements of the security architecture described herein. A user of the hardware will couple a software tester and a hardware test interface to the IC that contains the security architecture and in one embodiment will follow the minimal complexity sequence shown in FIG. 23. In this sequence, the IC test port will remain in reset when not used and so the beginning of the sequence 1000 will start by releasing the reset and all elements of the secure access will assume an initial default state. The software-hardware tester will then operate the serial security network and by passing specific data through the network and will configure the network to include certain segments and elements. The configuration will be established when an update operation is conducted. This network configuration can then be operated in such a manner to allow the code generator to be operated from the default condition left by the release of reset, to the target code value—different hardware configurations and code generators will require different operation times and different input data sequences to achieve the target code value. Once achieved, another update operation is conducted to pass the code generator code value to the code comparator. If the code does not match, then an unlock signal is not generated and the process must continue until the code generator does generate a code that matches, or until the tester places the entire architecture into reset. If the code generator code does match the stored comparator code, then the unlock generator generates and transmits an unlock signal to the gateway portion of the network. The gateway portion of the network can then be operated to provide access to the hidden secured embedded instruments.

Figure 24:
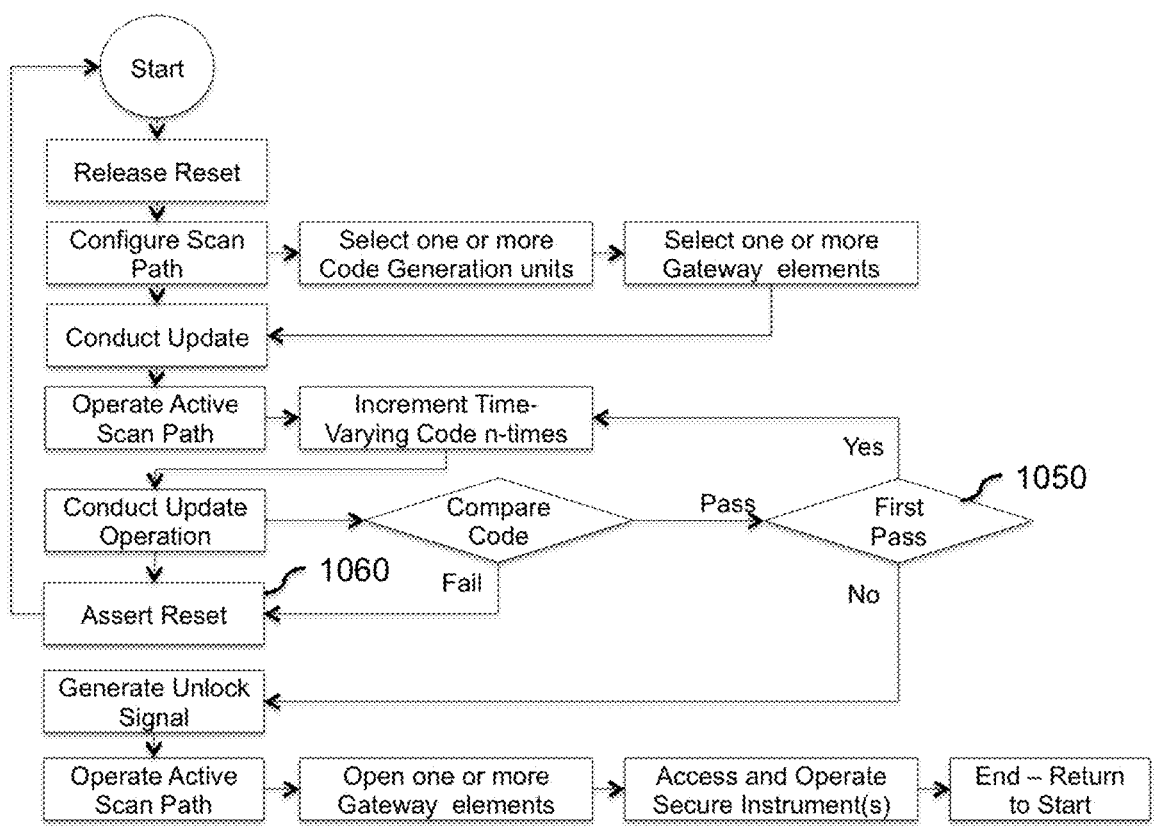
FIG. 24 depicts a flowchart that describes an alternate more complex operation that combines the hardware elements of scan path, gateway elements, code generator, code comparator, and unlock signal generators in a double-compare and assert-reset-on-fail method to enable access to embedded secure instruments.

FIG. 24 illustrates a more complex method that requires multiple code matches which can be implemented by placing a code match counter and checking portion to the method 1050. FIG. 24 illustrates only checking for the first pass 1050, but it should be noted that one skilled in the art may craft a circuit that takes any number of code check steps to achieve success and generation of the unlock signal. It must also be noted that this method refers to an embodiment FIG. 16 that includes a self-generated self-clearing reset so that not matching the comparator code at any step in the process will reset 1060 the unlock generator—or may reset the entire access network.

Figure 25:
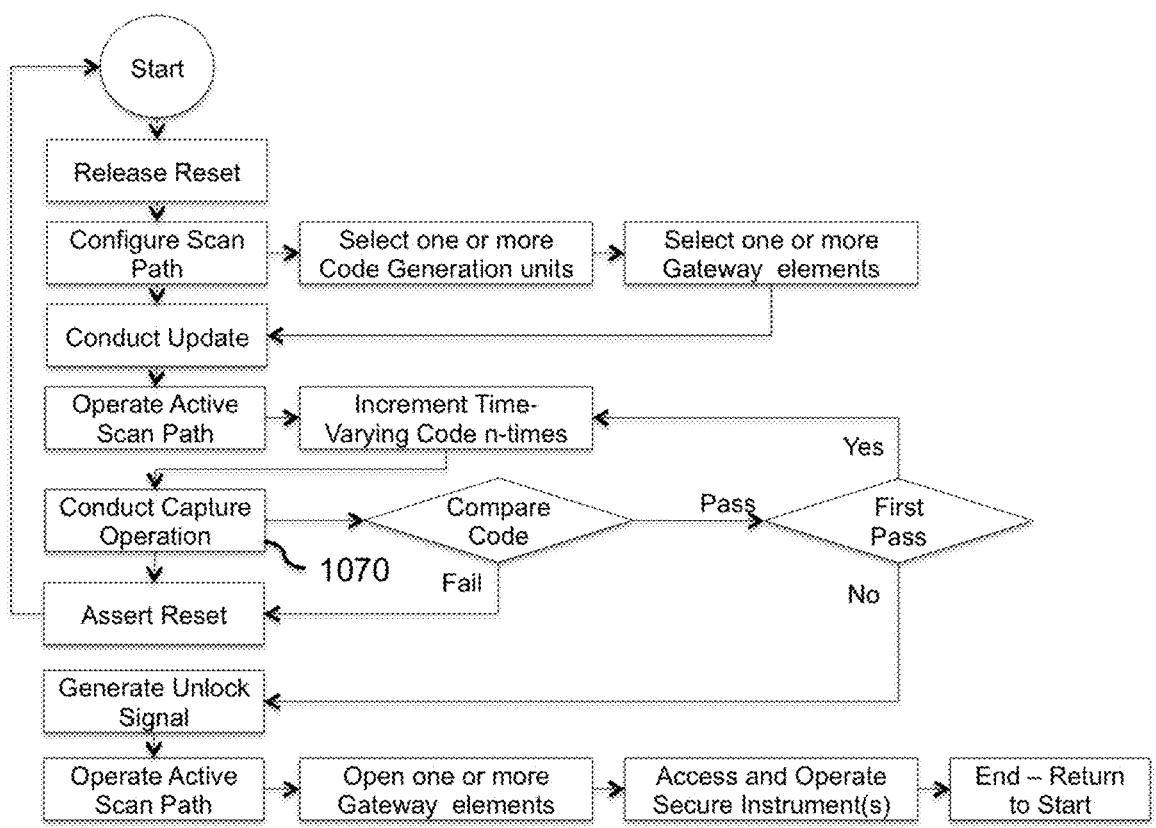
FIG. 25 depicts a flowchart that describes an alternate more complex operation that combines the hardware elements of scan path, gateway elements, code generator, code comparator, and unlock signal generators in a double-compare, that uses a capture instead of an update to initiate the compare, and uses an assert-reset-on-fail method to enable access to embedded secure instruments.

FIG. 25 illustrates that the comparing of the code generators code against the code or multiple codes stored in the code comparator unit, may be initiated by either an update operation or by a capture operation 1070.

Various embodiments of circuits that restrict access to embedded content related to scan path segments have been shown. These circuits use some form of time-varying code generation and match that code against a stored on-chip value using a code comparator to generate an unlock signal. The unlock signal is then coupled to any of several possible embedded instrument access mechanism to allow access to the hidden embedded content. The sequence of events or method of operation can also be used to elevate the security complexity, where any deviation of correct operation will result in the reset of all elements and denial of access to the hidden embedded content.

It will be apparent to those skilled in the art that various modifications and variations can be made without departing from the spirit or scope of the invention. Thus, it is intended that the disclosed embodiments cover modifications and variations that come within the scope of the claims that eventually issue in a patent(s) originating from this application and their equivalents. In particular, it is explicitly contemplated that any part or whole of any two or more of the embodiments and their modifications described above can be combined in whole or in part.

We claim:

1. An integrated circuit comprising:
a serial scan path comprising:
a SIB circuit adapted to:
receive a clock signal;
receive a serial input data signal;
receive an unlock signal; and
develop a first serial data out signal;
a first shift register of a first length adapted to:
receive said first serial data out signal;
receive said clock signal; and
develop a first output data as a function of said first serial data out signal and said clock signal; and
a second shift register adapted to:
receive a select signal;
receive said first serial data out signal;
receive said clock signal; and
develop a second serial data out signal if said select signal is asserted;
said SIB circuit further adapted to:
receive a scan enable signal;
receive said update enable signal;
receive said second serial data out signal;
receive said unlock signal;
develop said select signal as a function of said clock signal, said serial input data signal, said scan enable signal, an update enable signal, and said unlock signal;
develop said first serial data out signal as a function of said clock signal, said serial input data signal, and said scan enable signal; and
develop said first serial data out signal as a function of:
said clock signal, said serial input data signal, said second serial data out signal, and said scan enable signal if said select signal is asserted; and
said clock signal, said serial input data signal, and said scan enable signal if said select signal is de-asserted; and
a time-varying encryption code generation circuit coupled to said first shift register, said code generation circuit comprising:
an update register adapted to:
receive said clock signal;
receive said update enable signal;
receive said first output data; and
develop a second output data as a function of said first output data, said update enable signal, and said clock signal; and
a code comparator adapted to:
receive said second output data;
compare said second output data to a stored key value, and, in response, to:
develop an assert value on said unlock signal if said second output data matches said stored key value; and
develop a de-assert value on said unlock signal if said second output data does not match said stored key value.

2. The integrated circuit of claim 1 further comprising:
said serial scan path further comprising:
a third shift register of a second length adapted to:
receive said first serial data out signal;
receive said clock signal; and
develop a third output data as a function of said first serial data out signal and said clock signal.

3. The integrated circuit of claim 2, wherein said first length is different than said second length.

4. The integrated circuit of claim 1, said serial scan path further comprising:
a third shift register of a second length adapted to:
receive said first serial data out signal; receive said clock signal; and
develop a third output data as a function of said first serial data out signal and said clock signal.

5. The integrated circuit of claim 4, wherein said first length is different than said second length.

* * * * *